(12) United States Patent
Yoshimoto et al.

(10) Patent No.: US 7,710,063 B2
(45) Date of Patent: May 4, 2010

(54) ELECTRIC POWER CONVERTER

(75) Inventors: Kantaro Yoshimoto, Yokohama (JP);
Yasuhiko Kitajima, Kamakura (JP);
Kengo Maikawa, Yokosuka (JP)

(73) Assignee: Nissan Moto Co., Ltd., Yokohama-shi (JP)

( * ) Notice: Subject to any disclaimer, the term of this patent is extended or adjusted under 35 U.S.C. 154(b) by 463 days.

(21) Appl. No.: 11/724,566

(22) Filed: Mar. 15, 2007

(65) Prior Publication Data
US 2007/0216339 A1    Sep. 20, 2007

(30) Foreign Application Priority Data
Mar. 17, 2006  (JP) .............................. 2006-075094

(51) Int. Cl.
*H02P 27/04* (2006.01)
(52) U.S. Cl. ....................... 318/800; 363/157; 363/159; 363/163; 363/164
(58) Field of Classification Search ................. 318/800; 363/157, 159, 163, 164
See application file for complete search history.

(56) References Cited

U.S. PATENT DOCUMENTS

| | | | | |
|---|---|---|---|---|
| 4,675,802 | A * | 6/1987 | Sugimoto | 363/164 |
| 6,268,711 | B1 * | 7/2001 | Bearfield | 320/117 |
| 6,476,571 | B1 * | 11/2002 | Sasaki | 318/139 |
| 6,690,593 | B2 * | 2/2004 | Kimura et al. | 363/98 |
| 6,923,279 | B2 * | 8/2005 | Shimane et al. | 180/65.1 |
| 6,969,968 | B2 * | 11/2005 | Throngnumchai | 318/807 |
| 2006/0273748 | A1 | 12/2006 | Yoshimoto et al. | |

FOREIGN PATENT DOCUMENTS

| | | |
|---|---|---|
| EP | 1 615 325 A2 | 1/2006 |
| JP | 54-119609 | 9/1997 |
| JP | 2006-025518 | 1/2006 |
| JP | 2006-025520 | 1/2006 |
| JP | 2006-033955 | 2/2006 |
| JP | 2006-033956 | 2/2006 |

* cited by examiner

*Primary Examiner*—Bentsu Ro
*Assistant Examiner*—David S Luo
(74) *Attorney, Agent, or Firm*—Young Basile

(57) ABSTRACT

An electric power converter, electric power conversion system and method that, without using a DC-DC converter, uses and allots the electric power of plural power sources while reducing the volume and losses. At least one phase of the motor is connected to plural power sources and generates and synthesizes pulses from output voltages of plural power sources so as to drive the multi-phase AC motor. A different phase of the motor is connected to one DC power source and generates pulses from the output voltage of the power source so as to generate a driving voltage for the multi-phase AC motor. This arrangement allows use/allotment of the power of plural power sources with a reduced number of semiconductor components.

22 Claims, 34 Drawing Sheets

ELECTRIC POWER CONVERTER

CROSS-REFERENCE TO RELATED APPLICATION

This application claims priority from Japanese Patent Application Serial No. 2006-075094, filed Mar. 17, 2006, which is incorporated herein in its entirety by reference.

TECHNICAL FIELD

The invention relates in general to a type of electric power converter, and more particularly, a type of electric power converter for feeding driving electric power to a motor.

BACKGROUND

One known electric power converter is described in an "Electric power converter, and 2-power source system vehicle carrying same" in Japanese Kokai Patent Application No. 2006-25518. In this power converter, electric power is fed from plural power sources so as to drive a motor at high efficiency.

In the motor driving system described therein, plural power sources are connected in parallel to form a power source system. By feeding electric power to the motor from three or more potentials including a common potential, it is possible to drive the motor at any electric power allotment. In this way, it is possible to feed driving electric power to the motor from plural power sources simultaneously without having a DC-DC converter. As a result, it is possible to suppress loss and to realize high energy efficiency.

BRIEF SUMMARY OF THE INVENTION

One embodiment of an electric power converter for controlling feed voltages from plural power sources and driving a multi phase AC motor taught herein comprises an electric power conversion circuit and an electric power controller. The electric power controller is operable to control switching devices of the electric power conversion circuit to generate a driving voltage for driving at least a first phase of the motor by generating pulses from output voltages of the plural power sources and to generate a driving voltage for driving a different phase of the motor by generating pulses from an output voltage of only one of the plural power sources.

Electric power conversion systems are also taught herein. One example of a system for driving a multi phase AC motor including plural power sources where the plural power sources include at least a first power source and a second power source comprises an electric power converter configured to connect the first power source, the second power source and the motor. The electric power converter includes switches connected the plural power sources and operable to produce a first driving voltage for driving the motor by generating pulses from output voltages of the plural power sources and a switch connected to only one of the plural power sources and operable to produce a second driving voltage for driving the motor by generating pulses from an output voltage of the only one of the plural power sources.

Embodiments of a control method for an electric power converter for driving a multi phase AC motor using plural power sources are also taught herein. One method comprises generating voltage instruction values of each phase of the motor including a first voltage instruction value of a phase generating pulses from output voltages of the plural power sources, allotting the first voltage instruction value to respective voltage instruction values of each power source corresponding to an electric power allotment target, computing a modulation rate of an operation of a switch corresponding to each power source in the allotting step, correcting the modulation rate of the operation corresponding to each power source in the allotting step using a respective voltage of each power source, computing a modulation rate of an operation of a switch corresponding to a phase generating pulses from only one power source based on a voltage instruction value of the phase generating pulses from the only one power source, computing an offset voltage composed of a phase voltage of the phase generating pulses from only one power source and a phase voltage of the phase generating pulses from the output voltages of each of the plural power sources, amending a voltage instruction value of the phase generating pulses from the output voltages of the plural power sources, actuating a switch of the phase generating pulses from the output voltages of the plural power sources based on the modulation rate amended by the switch operation corresponding to the power sources and actuating a switch of the phase generating pulses from the only one power source based on the modulation rate of the phase generating pulses from the only one power source.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

For the known electric power converter described above, switches are set for feeding electric power from plural power sources in each phase matched to the driving phase number of the motor. As a result, the number of switches is large, and the cost is increased.

In contrast, embodiments of the invention provide a type of electric power converter that, without using a DC-DC converter, uses and allots the electric power of plural power sources while reducing the overall volume and loss with fewer semiconductor elements.

Accordingly, one embodiment of the electric power converter for driving a multi-phase AC motor has a phase in which it is connected to plural power sources and generates and synthesizes pulses from the output voltages of plural power sources so as to drive the multi-phase AC motor and a phase in which it is connected to one DC power source and generates pulses from the output voltage of the power source so as to generate a driving voltage for the multi-phase AC motor. It allows use/allotment of the power of plural power sources with fewer semiconductor elements.

In the following, an explanation will be given regarding embodiments of the invention with reference to the figures.

Figure 1:
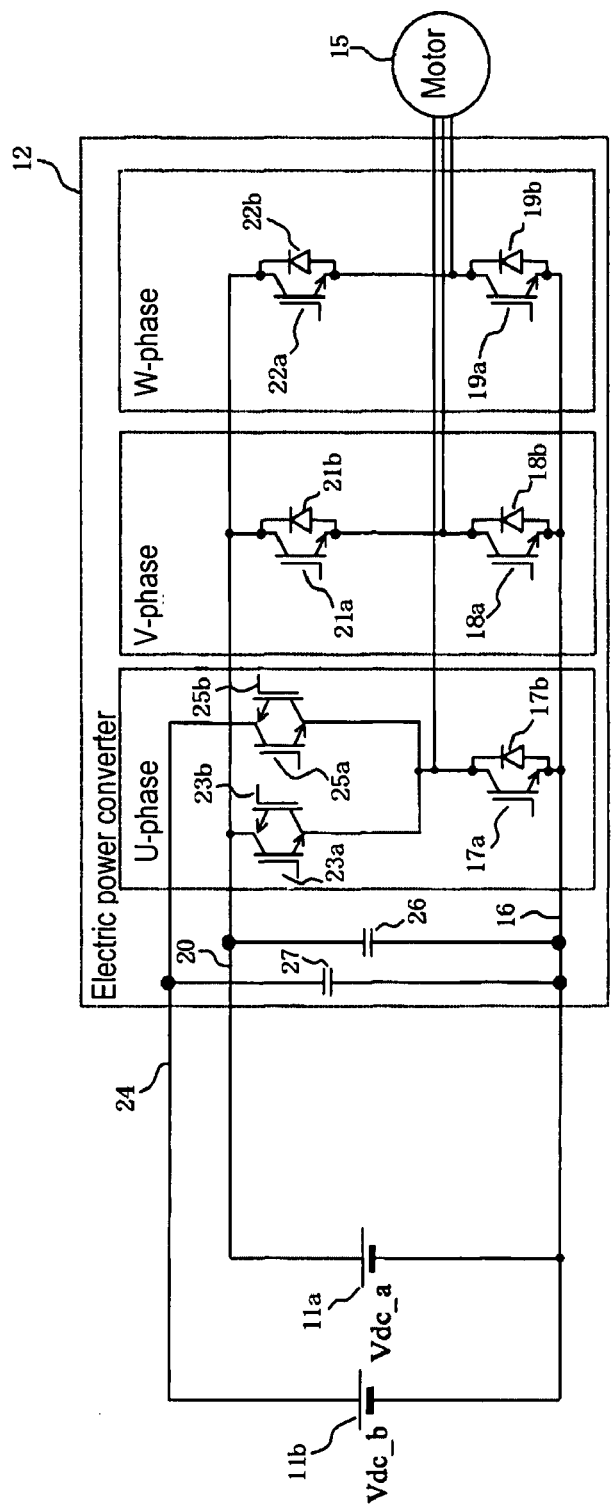
FIG. 1 is circuit diagram illustrating components of an electric power converter according to the first embodiment of the invention.

FIG. 1 is a circuit diagram illustrating an electric power converter according to a first embodiment of the present invention. As shown in FIG. 1, electric power converter 12 has plural groups of switching devices for the various phases (U-phase, V-phase, W-phase) of motor 15.

For both DC power source 11a and DC power source 11b, the negative electrode side is connected to common negative electrode bus 16. Common negative electrode bus 16 and the various phase terminals of motor 15 are connected via groups of semiconductor switches 17a, 18a and 19a and diodes 17b, 18b and 19b, respectively, just like the lower arm of a conventional inverter. Regarding the connection between positive electrode bus 20 of DC power source 11a and the various phase terminals of motor 15, for the V-phase and W-phase, connection is performed via groups of semiconductor switches 21a, 22a and diodes 21b, 22b. For the U-phase, connection is performed via the groups of semiconductor switches 23a, 23b that can control bidirectional conduction.

Connection between positive electrode bus 24 of DC power source 11b and the U-phase terminal of motor 15 is realized via the group of two semiconductor switches 25a, 25b. Connection between positive electrode bus 20 of DC power source 11a and common negative electrode bus 16 is performed via smoothing capacitor 26, and connection between positive electrode bus 24 of DC power source 11b and common negative electrode bus 16 is performed by smoothing capacitor 27.

This electric power converter 12 generates an output voltage applied on motor 15 as follows. For its U-phase, a voltage is generated based on the three potentials of common negative electrode bus 16, positive electrode bus 20 of DC power source 11a and positive electrode bus 24 of DC power source 11b. For the V-phase and W-phase, a voltage is generated based on the two potentials of common negative electrode bus 16 and positive electrode bus 20 of DC power source 11a. The semiconductor switches set for phases of motor 15 are switching devices that generate the voltages output to the phases of motor 15. From these potentials, one is selectively connected, and the necessary voltage is fed to motor 15 by changing the proportion of the connection time.

Electric power converter 12 has two functions. As one function, the three potential voltages of plural DC power sources are used, and the voltage needed for motor 15 is generated. As the other function, the electric power fed from DC power source 11a and DC power source 11b is set at any value.

For the former function, corresponding to the operation point of motor 15, the AC voltage needed for motor 15 is generated from the DC voltage by a PWM. More specifically, from the 3-level voltage an AC voltage is generated by the PWM.

The latter function is described in more detail herein. For example, in the motor driving system using a fuel cell as DC power source 11a and a rechargeable battery as DC power source 11b, from the viewpoint of efficiency and the response property of the fuel cell, etc., it is desirable that it be possible to set the proportion of electric power fed from the fuel cell and that from the battery at any value. Among other differences, embodiments of the invention differ from known converters in that it has heretofore been known to require a switch corresponding to the battery side of the V-phase and W-phase.

Here, the output voltage generated from the voltage of the fuel cell is (vuf, vvf, vwf), and the output voltage generated from the battery voltage is (vub, vvb, vwb)=(vub, 0, 0). Consequently, the electric power fed from the power source can be represented as follows:

$$P=(vuf+vub,vvf+vvb,vwf+vwb)\cdot(iu,iv,iw)=(vuf,vvf,vwf)\cdot(iu,iv,iw)+(vub,0,0)\cdot(iu,iv,iw).$$

On the right side, the first item is electric power Pf fed from DC power source 11a:

$$Pf=(vuf,vvf,vwf)\cdot(iu,iv,iw); \text{ and}$$

the second item is electric power Pb fed from DC power source 11b:

$$Pb=(vub,0,0)\cdot(iu,iv,iw).$$

The switches connected to DC power source 11b are only U-phase switches 25a, 25b. However, as can be seen from the formulas above, by adjusting (vuf, vvf, vwf) and (vub, 0, 0), it is possible to adjust Pf and Pb to any proportion. That is, in order to drive the motor, it is only required that the final values of (iu, iv, iw) be in agreement with the instruction values. By adjusting vuf, vvf, vwf and vub, 0, 0 in the range where iu, iv and iw agree with each other, it is possible to obtain any electric power Pf and electric power Pb.

Figure 2:
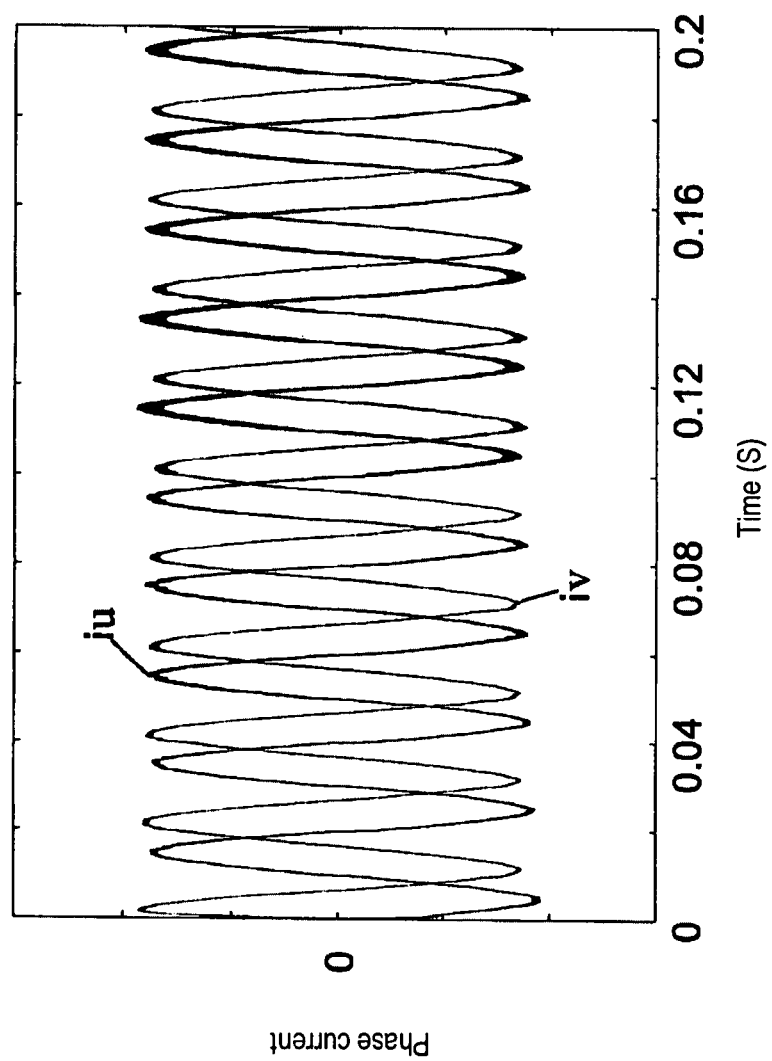
FIG. 2 is a waveform illustrating the current waveform of a motor (U-phase current iu, V-phase current iv) when the motor is driven while the feed electric power is shared by the fuel cell and the battery in the first embodiment.

FIG. 2 illustrates the motor current waveform (U-phase current iu, V-phase current iv) when the motor is driven while the feed electric power is shared by the fuel cell and the battery in the first embodiment. From FIG. 2 it can be seen that the current can be controlled normally.

As explained above, in the present example, the number of switches is reduced over what has been known. Also, by means of switch devices 21a, 22a, 21b, 22b connected to DC power source 11a of the V-phase and W-phase, a backward voltage rating is not required. As a result, device elements 21b, 22b can be diodes. That is, as it is possible to reduce the number of elements and the number of reverse blocking function elements, it is possible to cut the cost and to reduce the size and weight.

Figure 3:
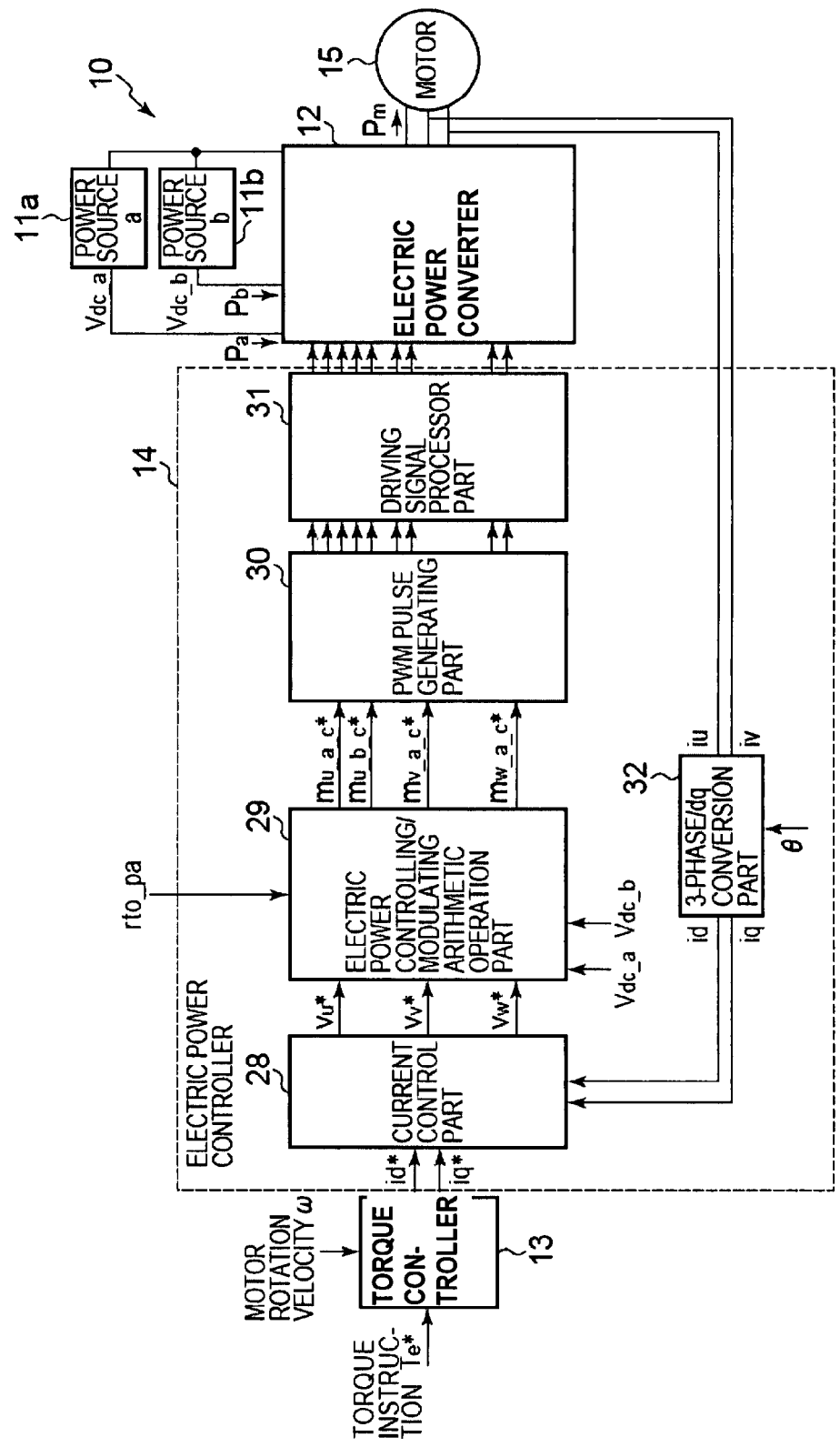
FIG. 3 is a block diagram illustrating components of the electric power conversion control system in the first embodiment.

FIG. 3 is a block diagram illustrating an electric power converter according to the first embodiment. As shown in FIG. 3, electric power conversion control system 10 has plural (two in this example) DC power sources 11a, 11b supplying respective power Pa, Pb, electric power converter (or conversion device) 12, torque controller 13 and electric power controller 14. The necessary voltage is fed from electric power converter 12 to a multi-phase motor 15. Here, motor 15 is a 3-phase AC motor receiving power Pm. Torque controller 13 and electric power controller 14 generally comprise a microcomputer including a central processing unit (CPU), input and output ports (I/O), random access memory (RAM), keep alive memory (KAM), a common data bus and read-only memory (ROM) as an electronic storage medium for executable programs and certain stored values as discussed hereinafter. The various parts of the electric power controller 14 could be, for example, implemented in software as the executable programs, or could be implemented in whole or in part by separate hardware in the form of one or more integrated circuits (IC).

As shown in FIG. 3, instruction value id* for the direct-axis (d-axis) current of motor 15 and instruction value iq* for the quadrature-axis (q-axis) current are computed from torque instruction value Te* and motor rotation speed ω in torque controller 13. Torque instruction value Te* is externally provided. According to one embodiment of torque controller 13, a previously-prepared map is stored that takes Te* and ω as axes and provides id*, iq* as output values.

As also shown in FIG. 3, electric power controller 14 has current control part 28, electric power controlling/modulating arithmetic operation part 29, pulse width modulation (PWM), pulse generating part 30, driving signal processor part 31 and 3-phase/dq conversion part 32.

Current control part 28 controls the current from d-axis current-instruction value id*, q-axis current instruction value iq*, d-axis current value id and q-axis current value iq of motor 15 obtained from 3-phase/dq conversion part 32 so that the instruction values are in agreement with the measured values. By means of this control, voltage instruction values vu*, vv*, vw* of the various phases of the 3-phase AC motor 15 are output.

Figure 4:
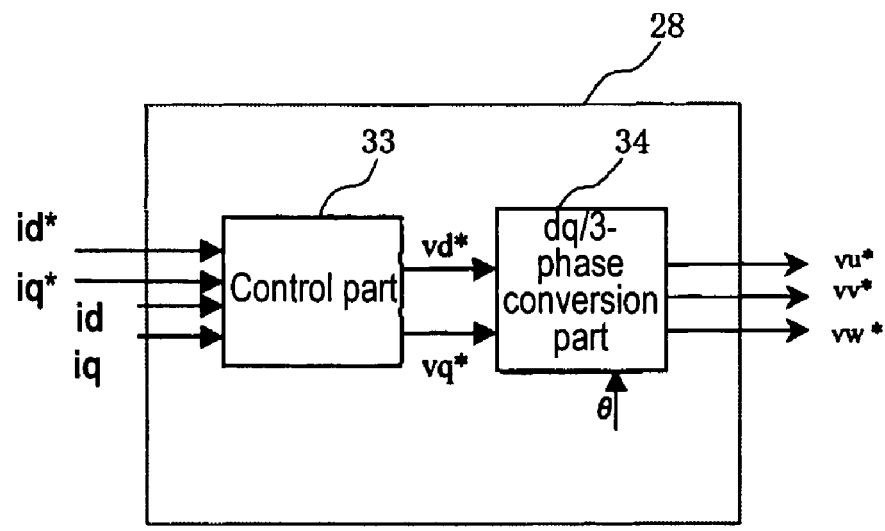
FIG. 4 is a block diagram illustrating in detail the current control part shown in FIG. 3.

FIG. 4 is a block diagram illustrating the components of the current control part 28 shown in FIG. 3. Current control part 28 has control part 33 and dq/3-phase conversion part 34. Control part 33 performs feedback control by means of proportional-integration (P-I) control so that d-axis current value id and q-axis current value iq follow d-axis current instruction value id* and q-axis current instruction value iq*, respectively. Control part 33 also outputs d-axis voltage instruction value vd* and q-axis voltage instruction value vq*. As explained above, d-axis current value id and q-axis current value iq are determined from U-phase current iu and V-phase current iv by means of 3-phase/dq conversion part 31.

In current control part 28, dq/3-phase conversion part 34 converts the d·q axis voltage instruction values to a 3-phase voltage instruction. More specifically, part 34 takes d-axis voltage instruction value vd* and q-axis voltage instruction value vq* as inputs, and it outputs U-phase voltage instruction value vu*, V-phase voltage instruction vv* and W-phase voltage instruction value vw* using angle θ.

Returning now to FIG. 3, electric power controlling/modulating arithmetic operation part 29 controls the electric power by using electric power distribution target values rto_pa, rto_pb fed from DC power source 11a and DC power source 11b. The electric power distribution target values may be target values given from the outside. For example, they may be freely determined from the state of the vehicle, the electric power residual quantity of the DC power source, etc. The electric power distribution target values represent the proportions of the electric power of DC power source 11a and DC power source 11b, and the electric power distribution target values rto_pa, rto_pb have the following relationship:

$$rto\_pa+rto\_pb=1.$$

Because only the U-phase has electric power fed from plural power sources in this embodiment, however, in consideration of this feature adjustment is performed beforehand so that the target value of rto_pb in the U-phase is a multiple of the phase number with respect to the distribution target value of the power source. For example, assuming that the target of DC power source 11a is 0.7, when electric power can be distributed for all three phases, the target of DC power source 11b is 0.3. Now, in the present embodiment, in order to share the electric power that is only in the U-phase of DC power source 11b, it is three times 0.3, that is, 0.9. On the other hand, for the U-phase of DC power source 11a, the electric power share of DC power source 11a is set at 0.1 so that the rto_pa+rto_pb=1 is met. Such arithmetic operation may be performed beforehand when the distribution target is generated externally.

Consequently, when the electric power distribution target value on one side is obtained from the arithmetic relationship, it is possible to determine the electric power distribution target value on the other side. That is, regarding the input to electric power controlling/modulating arithmetic operation part 29, for example, it may be only the electric power distribution target value rto_pa of DC power source 11a (see FIG. 3), and electric power distribution target value rto_pb of DC power source 11b is computed based on the arithmetic relationship.

In the following, an explanation is given regarding the U-phase as the phase that generates pulses from plural power sources.

Figure 5:
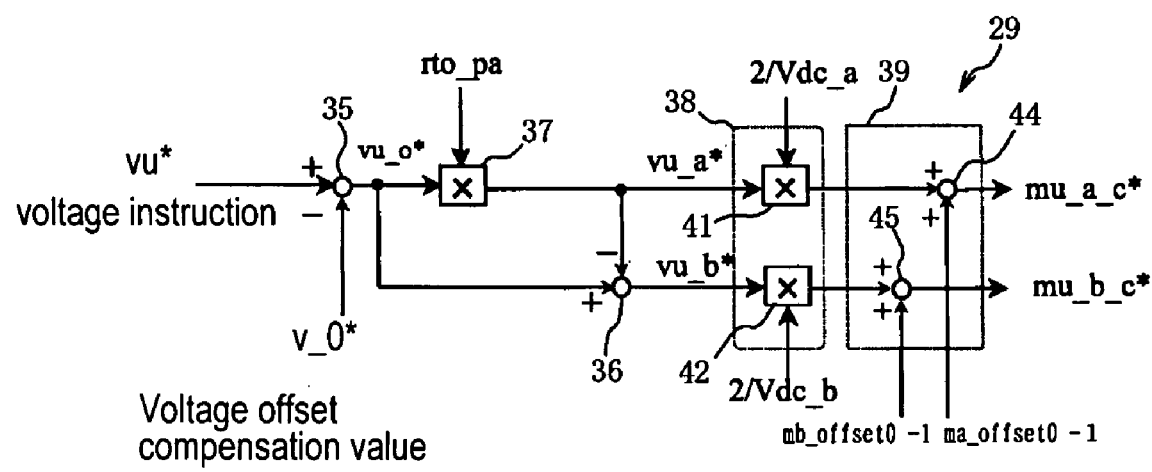
FIG. 5 is a block diagram illustrating in detail the electric power control/modulation rate arithmetic operation part shown in FIG. 3.

FIG. 5 is a block diagram illustrating in detail the electric power controlling/modulating arithmetic operation part 29 of FIG. 3. As shown in FIG. 5, electric power controlling/modulating arithmetic operation part 29 has subtractors 35, 36, multiplier 37, modulation rate arithmetic operation part 38 and modulation rate amendment part 39. Subtractor 35 subtracts voltage offset compensation value v_0* from input U-phase voltage instruction value vu* to determine voltage assignment value vu_0*. Details of voltage offset compensation value v_0* are explained later. Multiplier 37 multiplies electric power distribution target value rto_pa by voltage assignment value vu_0* to determine voltage instruction value vu_a* for DC power source 11a.

In the following, the instruction of the voltage generated from DC power source 11a will be called power source a portion voltage instruction, and the instruction of the voltage generated from DC power source 11b is called power-source b portion voltage instruction.

Voltage instruction value vu_a* on the side of DC power source 11a is determined by multiplying electric power distribution target value rto_pa by the result obtained by excluding voltage offset compensation value v_0* from voltage instruction value vu* according to:

$$vu\_0^*=vu^*-v\_0^*; \text{ and}$$

$$vu\_a^*=vu\_0^* \cdot rto\_pa.$$

On the other hand, the voltage instruction value on the side of DC power source 11b is determined by subtracting voltage instruction value vu_a* on the side of DC power source 11a from voltage assignment value vu_0* obtained from the control voltage of the motor current control by means of subtractor 36 according to:

$$vu\_b^*=vu\_0^*-vu\_a^*.$$

The following explanation regarding computation of the modulation rate and generation of PWM pulses is for the U-phase. For the V-phase and W-phase, the modulation rate is computed only from voltage instruction values vv*, vw* and voltage Vdc_a of DC power source 11a connected to V- and W-phases.

Figure 6:
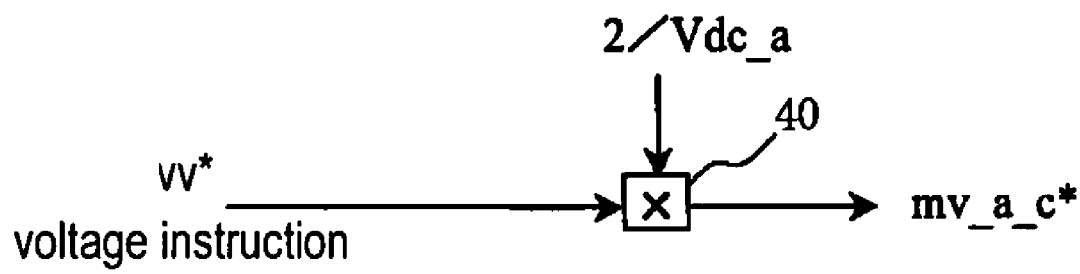
FIG. 6 is a block diagram illustrating the arithmetic operation in computing the modulation rate.

FIG. 6 is a block diagram illustrating the arithmetic operation for computation the modulation rate. By means of multiplier 40, 2/Vdc_a is multiplied by voltage instruction value vv* to determine modulation rate instruction value mv_a_c*.

$$mv\_a\_c^*=vv/(Vdc\_a/2); \text{ and}$$

$$mw\_a\_c^*=vw^*/(Vdc\_a/2).$$

Returning now to FIG. 5, modulation rate arithmetic operation means 38 generates instant modulation rate instruction values mu_a*, mu_b* as the normalized voltage instruction from voltage Vdc_a of DC power source 11a and voltage Vdc_b of DC power source 11b. That is, modulation rate arithmetic operation means 38 has multipliers 41, 42. Voltage instruction value vu_a* of the portion of power source a and voltage instruction value vu_b* of the portion of power source b of the U-phase are normalized by a value that is half their DC voltage, respectively, so that instant modulation rate instruction value mu_a* of the portion of power source a and instant modulation rate instruction value mu_b* of the portion of power source b are determined according to:

$$mu\_a^*=vu\_a^*/(Vdc\_a/2); \text{ and}$$

$$mu\_b^*=vu\_b^*/(Vdc\_b/2).$$

Figure 7:
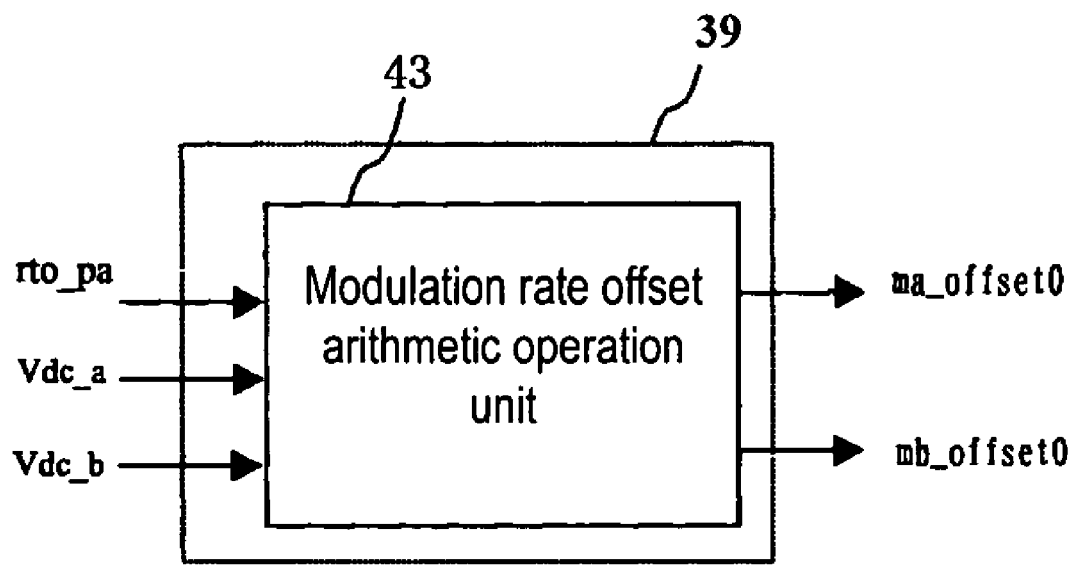
FIG. 7 is a diagram illustrating the input/output value in the modulation rate offset arithmetic operation unit of the electric power control/modulation rate arithmetic operation part shown in FIG. 5.

FIG. 7 is a diagram illustrating the input/output values in the modulation rate offset arithmetic operation unit 43 of the modulation rate correcting part 39 shown in FIG. 5. As shown in FIG. 7, modulation rate correcting part 39 uses modulation rate offset arithmetic operation unit 43 to allot the time width of the PWM period and to compute the final modulation rate instruction value so as to output the obtained modulation rate.

First, in modulation rate offset arithmetic operation unit 43, from power source voltage Vdc_a of DC power source 11a, power source voltage Vac_b of DC power source voltage source 11b, and electric power distribution target value rto_pa of DC power source 11a, the next modulation rate offsets ma_offset0, mb_offset0 are computed according to:

$$ma\_offset0 = \frac{\left|\frac{rto\_pa}{Vdc\_a}\right|}{\left|\frac{rto\_pa}{Vdc\_a}\right| + \left|\frac{rto\_pb}{Vdc\_b}\right|}$$

and $$mb\_offset0 = \frac{\left|\frac{rto\_pb}{Vdc\_b}\right|}{\left|\frac{rto\_pa}{Vdc\_a}\right| + \left|\frac{rto\_pb}{Vdc\_b}\right|}$$

Here, electric power distribution target value rto_pb of DC power source 11b is computed using the formula rto_pb=1−rto_pa as discussed previously.

Then, by means of adder 44 and adder 45, modulation rate offsets ma_offset0 and mb_offset0 are added, respectively, to instant modulation rate instruction value-mu_a* of the portion of power source a and instant modulation rate instruction value mu_b* of the portion of power source b. The final modulation rate instruction values mu_a_c*, mu_b_c* are determined using the following formulas:

$$mu\_a\_c^* = mu\_a^* + ma\_\text{offset} - 1; \text{ and}$$

$$mu\_b\_c^* = mu\_b^* + mb\_\text{offset} - 1.$$

Figure 8:
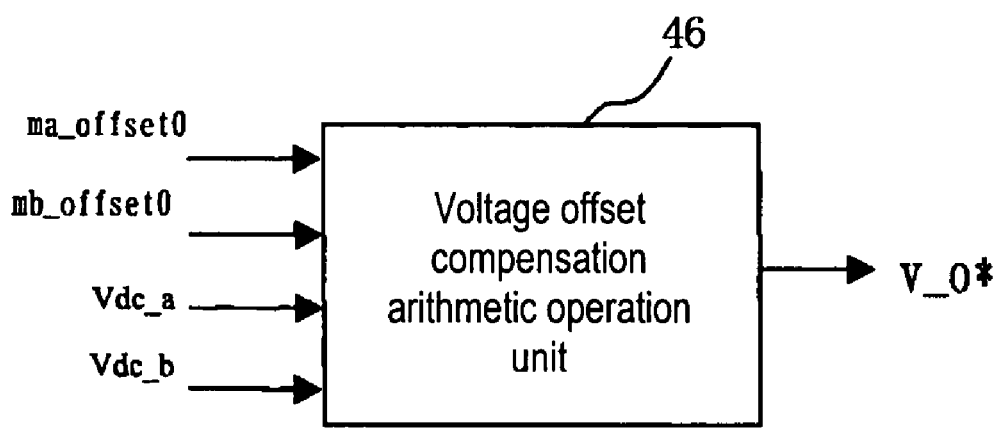
FIG. 8 is a diagram illustrating the input/output values of the voltage offset compensation value arithmetic operation unit that computes the voltage offset compensation value.

FIG. 8 is a diagram illustrating the input/output values in the voltage offset compensation arithmetic operation unit 46 that computes the voltage offset compensation value v_0*. By means of voltage offset compensation arithmetic operation unit 46, voltage offset compensation value v_0* is computed using modulation rate offsets ma_offset0 and mb_offset0 and the power source voltage.

As seen from DC power source 11a alone, that is, when electric power distribution target value rto_pa=1, for both the V-phase and W-phase average value vu_out_ave1 of output voltage vu_out for one period of the electrical angle is as follows:

$$vu\_out\_ave1 = Vdc\_a/2.$$

On the other hand, when electric power distribution target value rto_pa is set at a value different from 1, the average value becomes the sum of the voltage average value output from DC power source 11a and the voltage average value output from DC power source 11b according to:

$$vu\_out\_ave2 = Vdc\_a/2 \cdot ma\_\text{offset}^* + Vdc\_b/2 \cdot mb\_\text{offset}^*.$$

The difference in the output voltages Δvu_out_ave can be determined as follows:

$$\Delta vu\_out\_ave = Vdc\_a/2 \cdot ma\_\text{offset}^* + Vdc\_b/2 \cdot mb\_\text{offset}^* - Vdc\_a/2.$$

Because the difference in the output voltages Δvu_out_ave becomes the offset voltage when the V-phase and W-phase are compared, the following voltage offset compensation value v_0* is computed so that an offset current does not flow in motor 15 according to:

$$v\_0^* = \Delta vu\_out\_ave.$$

In this embodiment, as explained above, because control is performed based on the value obtained by subtracting voltage offset compensation value v_0* from U-phase voltage instruction value vu*, the phase voltage of the U-phase is in agreement with the phase voltage of the V-phase and W-phase, and a flow of offset current is prevented.

Figure 9:
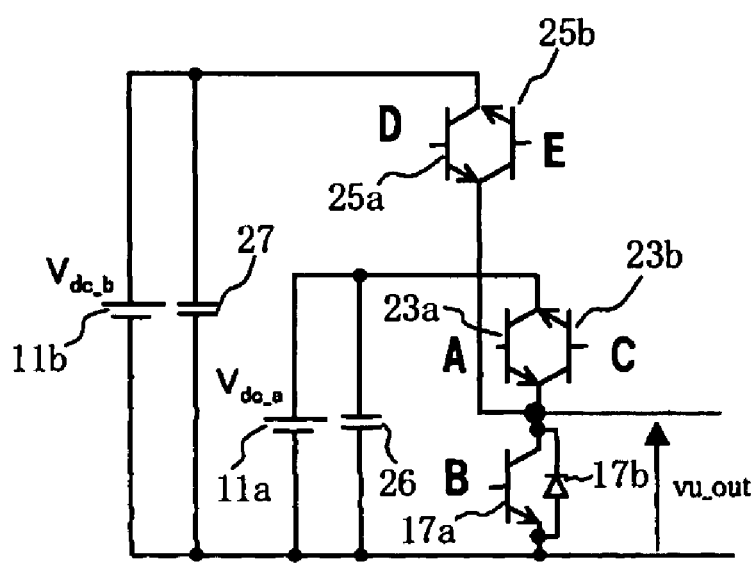
FIG. 9 is a circuit diagram illustrating the U-phase in FIG. 1.
Figure 10:
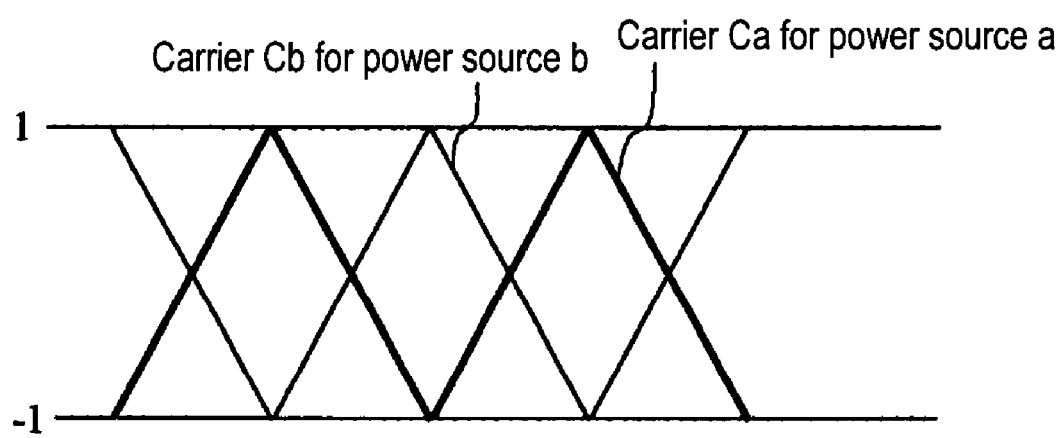
FIG. 10 is a diagram illustrating the waveform of the sawtooth waves used in the PWM pulse generating part shown in FIG. 3.

FIG. 9 is a circuit diagram illustrating the U-phase in FIG. 1, and FIG. 10 illustrates the waveform of triangular waves used in the PWM pulse generating part 30 shown in FIG. 3. As shown in FIG. 10, carrier Ca for DC power source 11a is triangular wave carrier for generating PWM pulses that drive the various switching devices for output of voltage pulses from voltage Vdc_a of DC power source 11a. Similarly, triangular wave carrier is set as carrier Cb for DC power source 11b. For the two triangular wave carriers Ca, Cb, the upper limit is +1, the lower limit is −1, and there is a phase difference of 180°. Signals A-E that drive the various switching means of the U-phase are shown in FIG. 9 as follows:

A: Signal for driving the switch 23a for conduction from DC power source 11a to the output terminal;

B: Signal for driving the switch 17a for conduction from the output terminal to the negative electrode;

C: Signal for driving the switch 23b for conduction from the output terminal to DC power source 11a;

D: Signal for driving the switch 25a for conduction from DC power source 11b to the output terminal; and E: Signal for driving the switch 25b for conduction from the output terminal to DC power source 11b.

Next, an explanation is given for the pulse generation method when voltage pulses are output from DC power source 11a. When PWM pulses are output from DC power source 11a, driving signal A must be in the ON state. If there is a potential difference between the positive electrode of DC power source 11a and the positive electrode of DC power source 11b, and power source voltage Vdc_a of DC power source 11a is higher than power source voltage Vdc_b of DC power source 11b (Vdc_a>Vdc_b), when both driving signal A and driving signal E are ON, a short circuit current flows between the two positive electrodes. On the other hand, driving signal E is provided secure a return current course of DC power source 11b. When PWM pulse is supplied by the DC power source 11b, driving signal E is always an ON state.

For example, when driving signal A is switched from ON to OFF, and driving signal E is simultaneously switched from OFF to ON, since time is required for driving signal A to become fully OFF, an overlap occurs with the ON state of driving signal E. Both are ON for a time, a short circuit current flows, and the heat generated by the semiconductor switches set on the path may increase.

In order to prevent this increase in heat generation, after a time during which both driving signal A and driving signal E are OFF, driving signal A and driving signal E are switched from OFF to ON. In this way, a short circuit preventing time (or dead time) is attached to the driving signal when generating pulses.

Just like the attachment of a dead time to driving signal A and driving signal E, a dead time is also attached to driving signal E and driving signal C. Also, in order to prevent a short circuit between the positive electrode and negative electrode, a dead time is attached to driving signal A and driving signal B, and to driving signal E and driving signal B.

Figure 11:
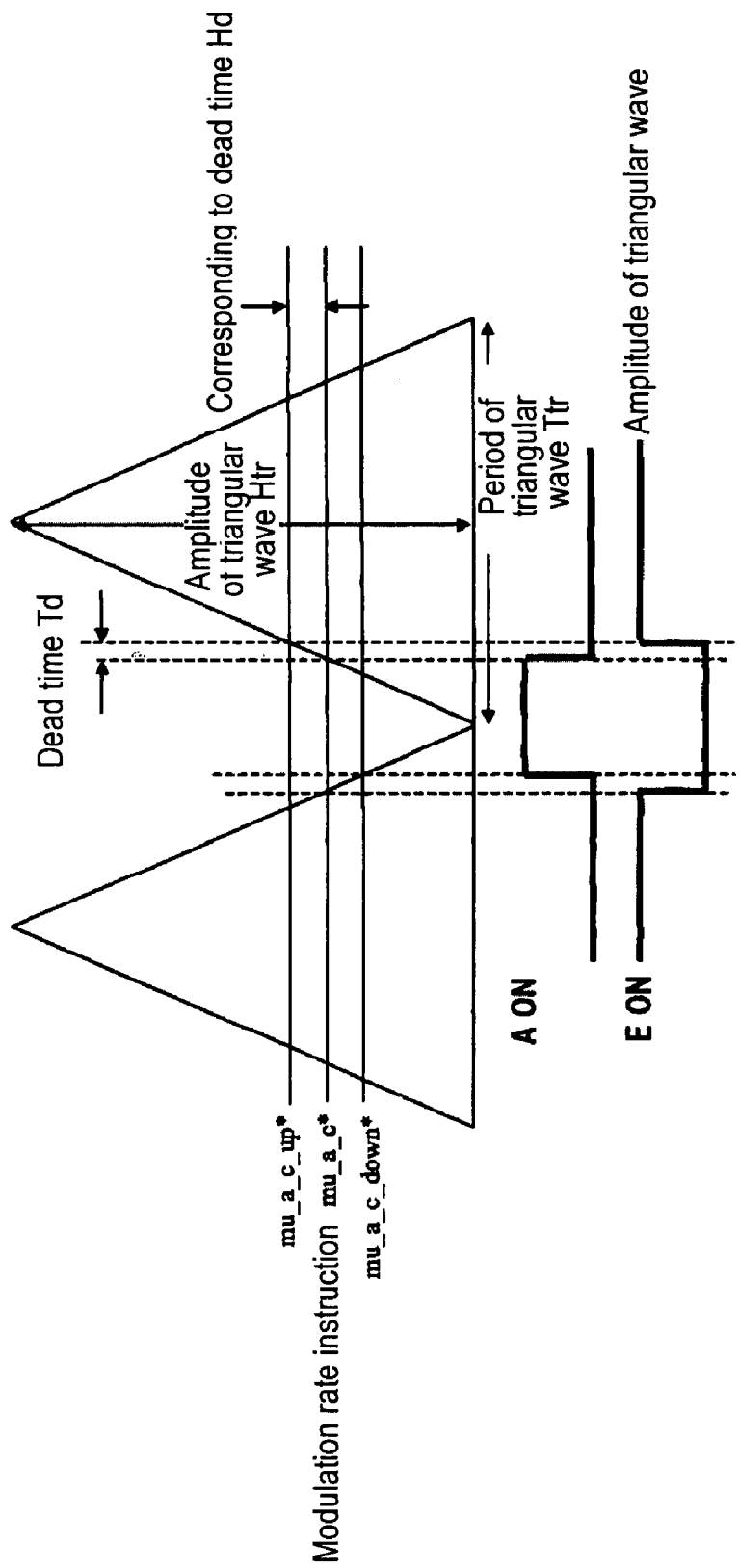
FIG. 11 is a waveform diagram illustrating generation of pulses of driving signal A and driving signal E by means of a sawtooth wave comparison.

FIG. 11 is a waveform diagram illustrating the generation of pulses of driving signal A and driving signal E by means of a sawtooth wave comparison. As shown therein, in order to attach a dead time to driving signal A and driving signal E in generating the driving signals, modulation rate instruction values mu_a_up*, mu_a_c_down* offset by a dead time from modulation rate instruction value mu_a_c* are determined as follows:

$$mu\_a\_c\_up^* = mu\_a\_c^* + Hd; \text{ and}$$

$$mu\_a\_c\_down^* = mu\_a\_c^* - Hd.$$

Here, from the amplitude Htr (from bottom edge to apex) of the sawtooth wave, period Ttr, and dead time Td, Hd is determined as follows:

$$Hd = 2Td \times Htr/Ttr.$$

The carrier is compared with the various modulation rate instruction values mu_a_c*, mu_a_c_up*, mu_a_c_down*, and the state of switching of driving signal A and driving signal E are determined according to the following rules:

1) If mu_a_c_down* ≧ carrier for DC power source 11a, then driving signal A=ON;

2) If mu_a_c* ≦ carrier for DC power source 11a, then driving signal A=OFF;

3) If mu_a_c* ≧ carrier for DC power source 11a, then driving signal E=OFF; and

4) If mu_a_c_up* ≦ carrier for DC power source 11a, then driving signal E=ON.

In this way, by generating the driving signal, it is possible to set dead time Td between driving signal A and driving signal E, and it is possible to prevent a short circuit between the positive electrodes.

Figure 12:
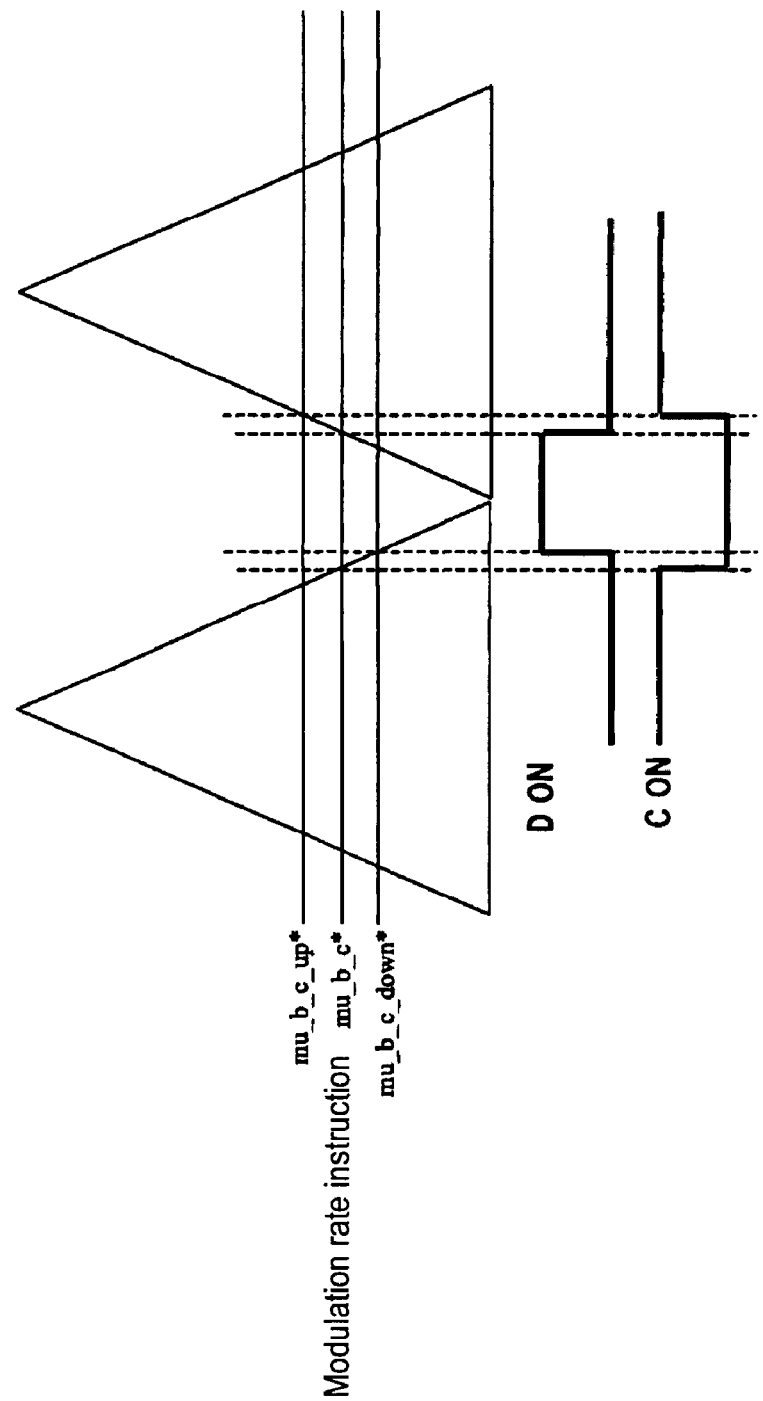
FIG. 12 is a waveform diagram illustrating generation of pulses of driving signal D and driving signal C by means of a sawtooth wave comparison.

FIG. 12 is a waveform diagram illustrating pulse generation of driving signal D and driving signal C by means of a triangular wave wave comparison. As shown therein, the pulse generation method when voltage pulses are output from DC power source 11b is the same as in the case of DC power source 11a. In order to generate a driving signal with a dead time attached to driving signal D and driving signal C, modulation rate instruction values mu_b_c_up* and mu_b_c_down* offset by a dead time portion from modulation rate instruction value mu_b_c* are determined according to:

$$mu\_b\_c\_up^* = mu\_b\_c^* + Hd; \text{ and}$$

$$mu\_b\_c\_down^* = mu\_b\_c^* - Hd.$$

These values are then compared with the carrier for DC power source 11b. The state of the switch of driving signal D and driving signal C is determined according to the following rules:

1) If mu_b_c_down*≧carrier for DC power source 11b, then driving signal D=OFF;
2) If mu_b_c*≦carrier for DC power source 11b, then driving signal D=OFF;
3) If mu_b_c*≧carrier for DC power source 11b, then driving signal C=OFF; and
4) If mu_b_c_up*≦carrier for DC power source 11b, then driving signal C=ON.

In this way, it is also possible to set dead time Td between driving signal D and driving signal C, and it is possible to prevent a short circuit between the positive electrodes.

Figure 13:
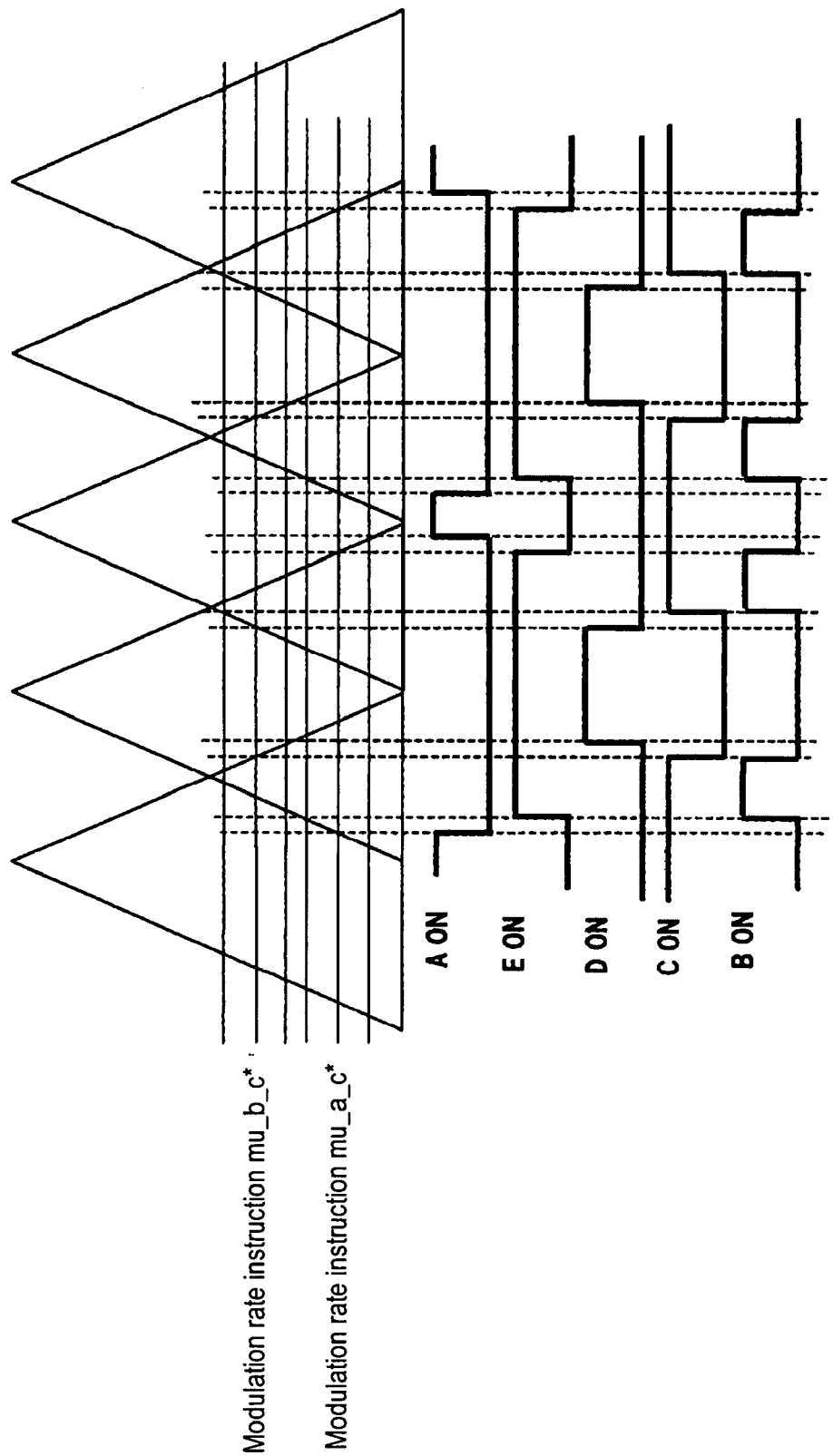
FIG. 13 is a waveform diagram illustrating an example of pulse generation attached with dead time Td;}

FIG. 13 illustrates the waveform of an example of generation of pulses with dead time Td attached. Driving signal E is a signal obtained by attaching dead time Td between it and driving signal A, and driving signal C is a signal obtained by attaching dead time Td between it C and driving signal D. Consequently, when driving signal B is generated as an AND function of driving signal E and driving signal C according to:

$$B = E \cdot C,$$

it is possible to generate dead time Td in driving signal B and driving signal A and in driving signal B and driving signal E.

Figure 14:
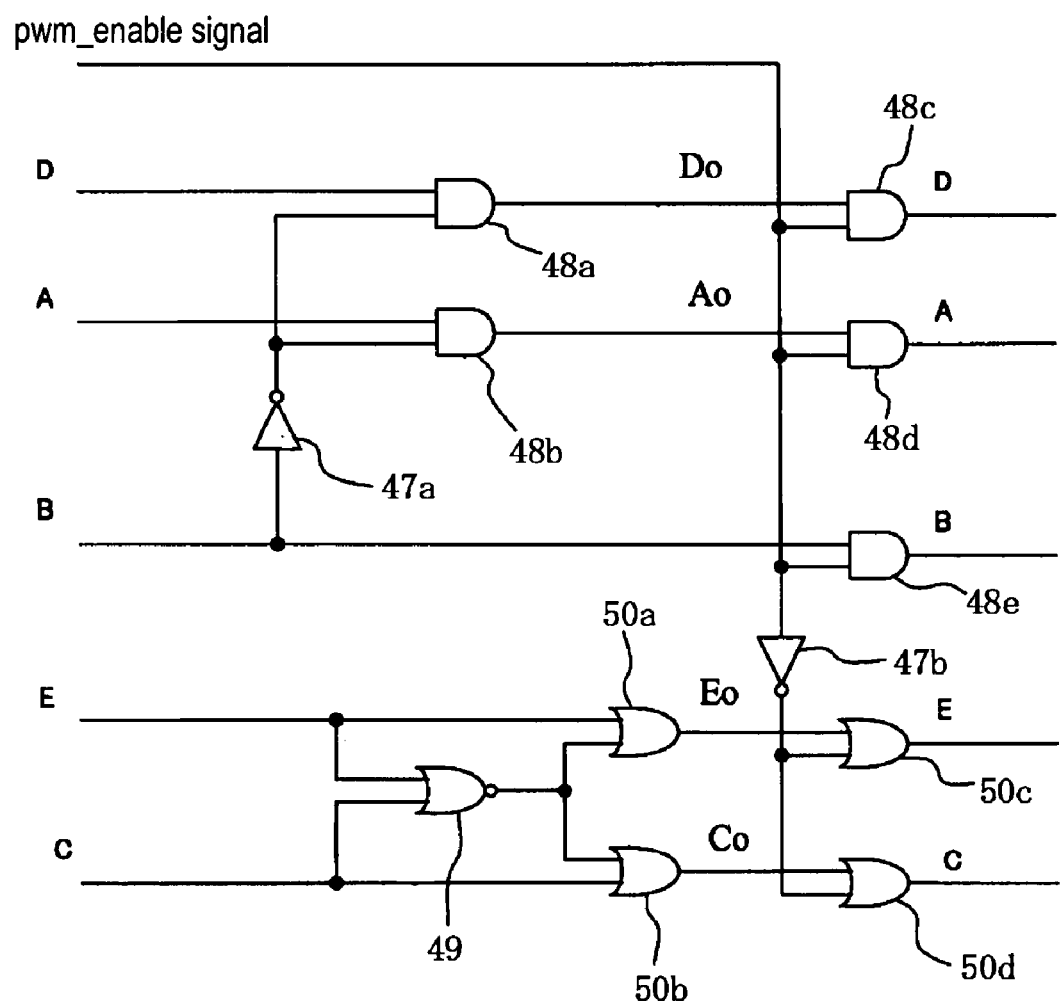
FIG. 14 is a circuit diagram illustrating the components of the driving signal processor part shown in FIG. 8.

Driving signal A through driving signal E for the various switches are input to driving signal processor part 31 shown in FIG. 3. FIG. 14 is a circuit diagram illustrating the driving signal processor part 31. An explanation is given here for signal processing for the U-phase. However, for phases other than the U-phase, the operation is the same as that of generation of signal of DC power source 11a shown in FIG. 11, and it will not be explained in detail again.

As shown in FIG. 14, driving signal processor part 31 has NOT circuits 47a, 47b, AND circuits 48a, 48b, 48c, 48d, 48e, NOR circuit 49 and OR circuits 50a, 50b, 50c, 50d. Driving signal processor part 31 is a logic circuit that takes driving signals A-E of the various switches and ON/OFF judgment signal pwm_enable as inputs and outputs the driving signals of the various switches. Before performing a logic operation with the ON/OFF judgment signal pwm_enable, an AND operation is performed for driving signal B as logically inverted by NOT circuit 47a and driving signal A and driving signal D, respectively, by means of AND circuit 48a and AND circuit 48b. Signals Ao, Do are respectively output. As a result, it is possible to prevent the output of a signal with simultaneous ON of driving signal A and driving signal B and simultaneous ON of driving signal D and driving signal B, and it is possible to prevent a short circuit between electrodes.

Also, for a L (Low) signal with both driving signal C and driving signal E OFF, the output of NOR circuit 49 becomes H (High). Since this signal and original driving signal E pass through OR circuit 50a, signal Eo output from OR circuit 50a becomes H. Similarly, since driving signal C passes through OR circuit 50b, signal Co output from OR circuit 50b becomes H. That is, when the signal passes to driving signal processor part 31, when both driving signal E and driving signal C are OFF signals, the switches driven by driving signal E and driving signal C is turned ON, so that a current path from motor 15 to the power source can be guaranteed.

The AND values between ON/OFF judgment signal pwm_enable and signals Ao, Do, and signal Bo based on input driving signal B are respectively determined by AND circuits 48c, 48d, 48e, and driving signals A, D, B are output. By means of this logic operation, when ON/OFF judgment signal pwm_enable is L, driving signals A, D, B become L, and the switches driven by these signals are OFF. Feeding of electric power from the power source to the load is stopped.

Also, the OR values between signals Co, Eo and the signal obtained by inverting ON/OFF judgment signal pwm_enable by NOT circuit 47b are determined by OR circuits 50c, 50d, and driving signal E and driving signal C are output. Through this logic operation, ON/OFF judgment signal pwm_enable becomes L. That is, a stop signal for electric power converter 12 is received. Both driving signal C and driving signal E become H, and the switches driven by driving signal C and driving signal E are turned ON.

In this way, electric power converter 12 driven as described above allows operation of the electric power allotment of DC power source 11a and DC power source 11b, and it is possible to perform allotment control for the power of conventional power converter. As a result, it is possible to realize a smaller size and higher efficiency for the overall electric power conversion system.

Also, by adding a voltage offset compensation value only to the phase where pulses are generated from plural power sources, the sum of the average ON times for one period of the electrical angle of semiconductor switch 23a (associated with signal A) and semiconductor switch 25a (associated with signal D) of the U-phase becomes different from the switches of the V-phase and W-phase (semiconductor switches 21a, 22a). Similarly, the average ON times of the switches (semiconductor switches 17a, 18a) connected to common negative electrode bus line 16 are different from each other.

By controlling so that these ON/OFF switch times are realized, even when the output voltage pulses are divided and allotted from DC power sources of different power source voltages, the average output voltages of the various phases in one period of the electrical angle are equal to each other. Hence, the motor can be driven with the same AC current waveform as that for conventional inverter driving, and it is possible to allot the power of power sources without generation of significant torque ripple in the motor current and without a significant decrease in the efficiency.

Figure 15:
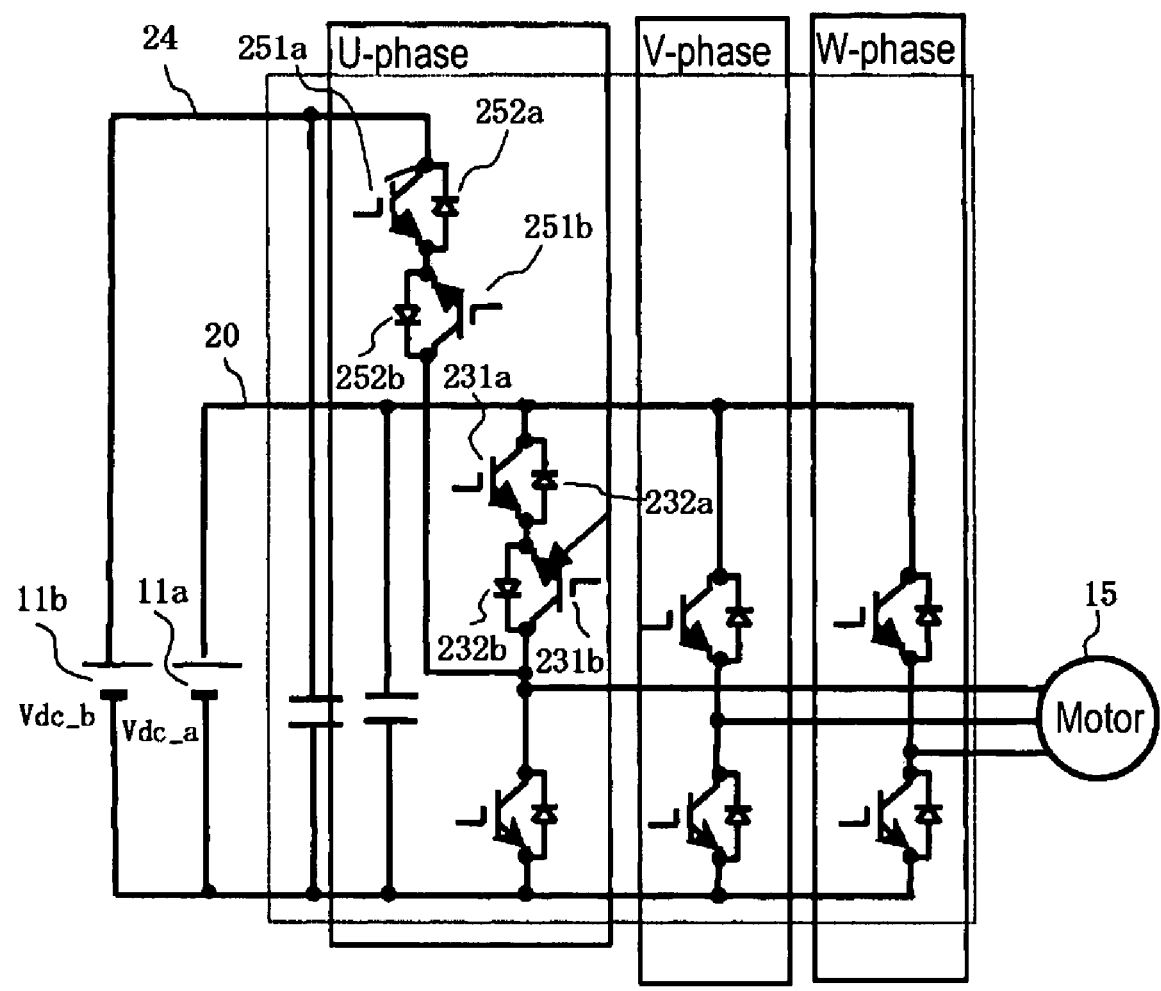
FIG. 15 is a circuit diagram illustrating alternative components of the electric power converter shown in FIG. 1.

FIG. 15 is a circuit diagram illustrating another make up of the electric power converter shown in FIG. 1. As shown in FIG. 15, the switching device required to obtain a reverse blocking function is composed of a IGBT (Insulated Gate Bipolar Transistor) and diodes. Switches 25a, 25b are replaced with a serial connection of a group composed of IGBT 251a that stops current in the direction from the power source to the motor 15 and switches power feeding and diode 252a that allows flow of current only in the direction from the motor 15 to the power source, and a group composed of IGBT 251b that stops current from the motor 15 to the power source and switches power feeding and diode 252b that can stop current only in the direction from the power source to the motor 15.

With this arrangement, it is possible to form switches 25a, 25b without using a reverse blocking-type IGBT. Similarly, the switching device formed by switches 23a, 23b can also be formed instead by a switching device including IGBT 231a, diode 232a, IGBT 231b and diode 232b.

Figure 16:
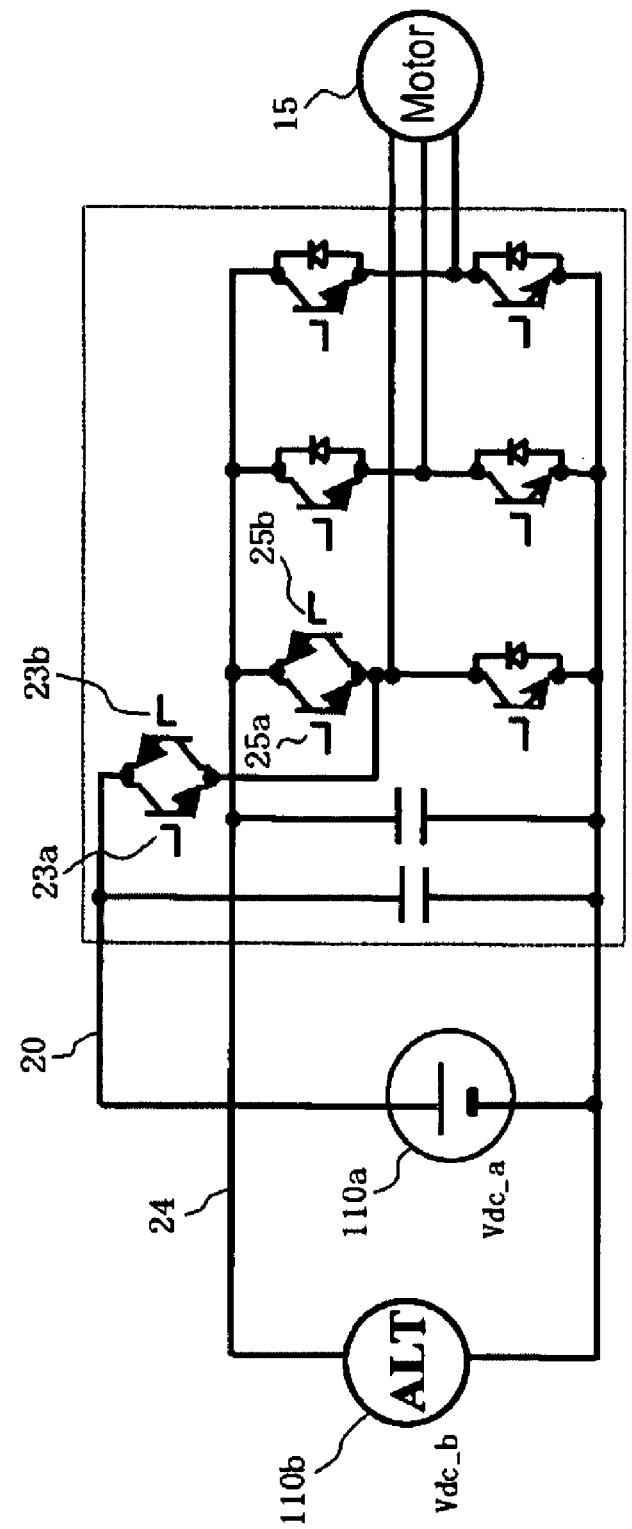
FIG. 16 is a circuit diagram illustrating alternative components of the electric power converter shown in FIG. 1.

FIG. 16 is a circuit diagram illustrating yet another arrangement of the electric power converter shown in FIG. 1. In this arrangement, among the two power sources, one power source Vdc_b is a 42V type alternator 110b, and the other power source Vdc_a is a 14V type battery 110a. For a vehicle having this 2-power source system carried on it, in order to eliminate the instability of the voltage generated by the 42V type alternator 110b, usually connected to the engine or another primary driving machine, it is sometimes desirable to set another 42V type battery.

Also, in a vehicle, 14V type battery 110a can be present as a battery for auxiliary equipment for turning ON the head lights, etc. In this case, when electric power is charged in 14V type battery 110a, the voltage of 42V type alternator 110b is lowered by a DC/DC converter or the like for feeding.

In this arrangement, it is possible to perform the same function as that of a combination of a single 42V type alternator and a single 14V type battery. The mechanism is as follows. For the 14V type battery 10a, a portion of the electric power fed from 42V type alternator 110b to motor 15 is fed back via switch 25b to 14V type battery 110a so that 14V type battery 110a can be charged. When the voltage of the power generated by 42V type power generator 110a is unstable, the electric power of 14V type battery 110b is fed through switch 25a to the motor 15, so that the instability in driving of the motor 15 can be alleviated.

As explained above, in the present embodiment, the scheme is not limited to plural DC power sources. It is also possible to use various combinations, such as a combination of a fuel cell and a battery, a combination of a battery and another battery, a combination of an alternator and a battery, etc. The alternator may also be replaced by an AC current source via a rectifier, such as so-called commercial AC power.

In the following, an explanation is given regarding the effects of the present embodiment.

The arrangement of the embodiment is as follows. Plural power sources are DC power sources of different potentials. For the switching devices of the phase connected to the plural power sources, the switches connected to the lowest potential are active elements without a reverse blocking function and diodes, and the remaining are made of elements having a reverse blocking function. The phase connected to one DC power source has all of its arms composed of active elements without a reverse blocking and diodes. As a result, it is possible to reduce the number of elements.

Also, the switch of the phase with the output connected to the plural power sources generates pulses with the average value of the ON time for one period of the electric angle different from the average value of the ON time for one period of the electric angle of the switch of the phase connected to one power source. Consequently, even when AC voltage is output from power sources with different voltages, by generating pulses with different ON time average values it is possible to output an average voltage value just like the AC voltage output from the phase connected to one power source. By identical setting of the level of the average voltage value, no offset current flows in the AC current, and it is possible to operate the motor without torque ripple and without a decrease in the efficiency of the motor.

The phase voltage instruction value of the phase that generates pulses from the plural power sources and synthesizes them for output has an offset value with respect to the phase voltage instruction value of the other phase. Consequently, even if the output voltage pulses are divided and allotted from DC power sources having different power source voltages, it is still possible to have the same average output voltage for the various phases in one period of the electrical angle, and it is possible to drive with a motor current just like that in conventional inverter driving. It is further possible to allot the power of the power sources without generation of significant torque ripples in the motor current and without a decrease in efficiency.

In addition, the phase voltage instruction value of the phase that generates pulses from the plural power sources and synthesizes them for output is obtained by adding or subtracting the offset value with respect to the phase voltage instruction value of the other phase to/from the phase voltage instruction value before allotment of each power source. Consequently, it is possible to allot the power of the power sources without generation of significant torque ripple in the motor current and without a decrease in efficiency. Also, without changing control of the other phase from the well-known method of control of an inverter, one may adopt an embodiment of the control method taught herein for controlling only the phase that outputs pulses from plural power sources. As a result, one may adopt an arrangement simply by addition to control an electric power converter of the prior art.

Also, the offset value is computed from the voltage values of the power sources and the proportions of allotment of the phase voltage instruction value to the power sources. Accordingly, without newly detecting the output error voltage, it is possible to use information stored in the controller to allot the power of the power sources without generation of significant torque ripple in the motor current and without a decrease in efficiency.

In the following, an explanation is given regarding an electric power conversion control system as a second embodiment of the invention. An explanation is given only for differences from the first embodiment. For the electric power converter of the electric power conversion control system of the second embodiment, it is possible to perform pulse generation from plural power sources only for the U-phase. On the other hand, the electric power converter of the electric power conversion control system according to the second embodiment has a circuit arrangement that can perform pulse generation also in the V-phase.

Figure 17:
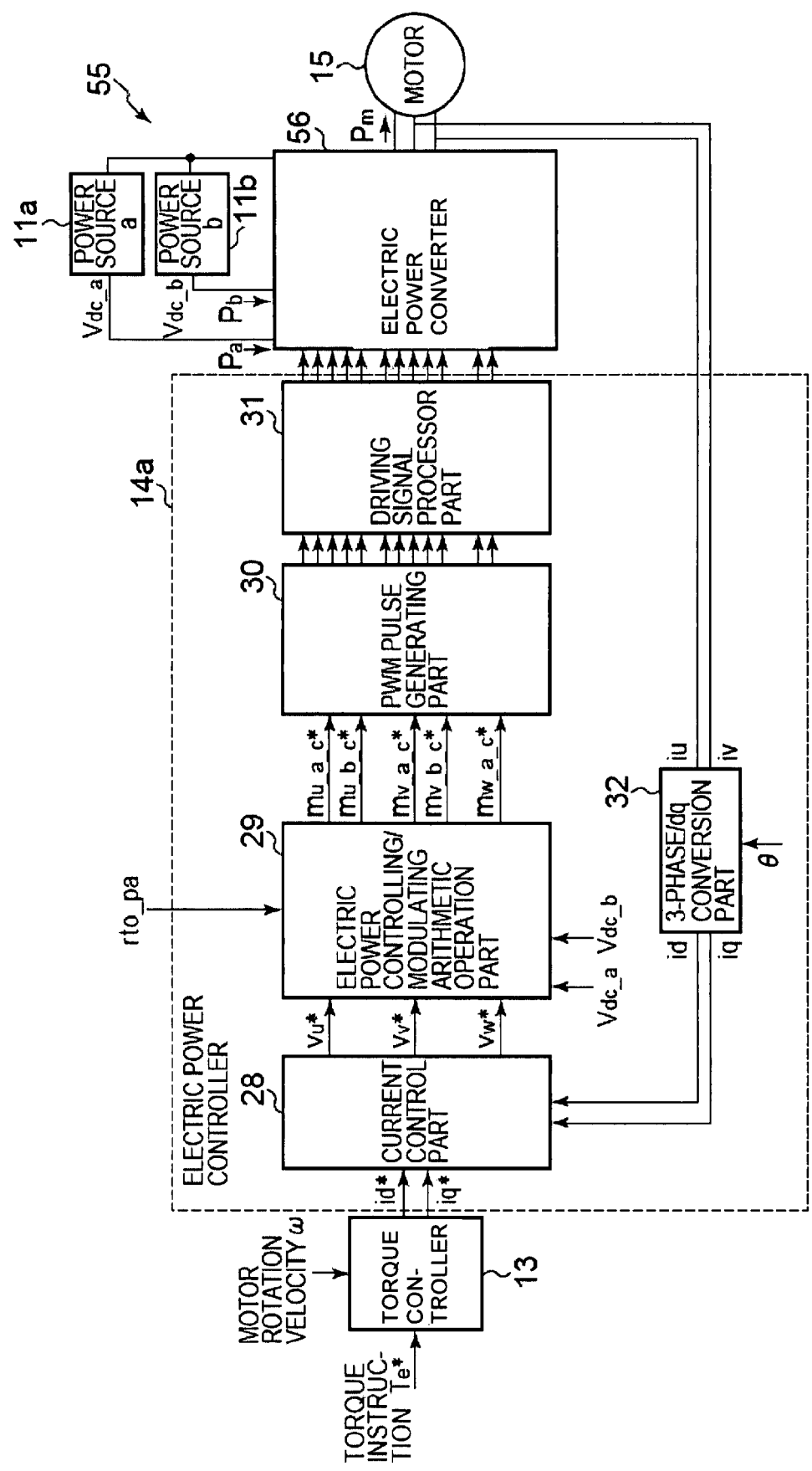
FIG. 17 is a block diagram illustrating components of the electric power conversion control system according to a second embodiment of the invention.

FIG. 17 is a block diagram illustrating the electric power conversion control system 55 according to the second embodiment. As shown in FIG. 17, electric power conversion control system 55 outputs modulation rate instruction value mv_b_c* from electric power controlling/modulating arithmetic operation part 29 of electric power controller 14a to PWM pulse generator 30. Also, the system has an electric power converter 56 with an arrangement different from that of electric power converter 12. The other features are the same as those of electric power conversion control system 10 in the first embodiment.

Figure 18:
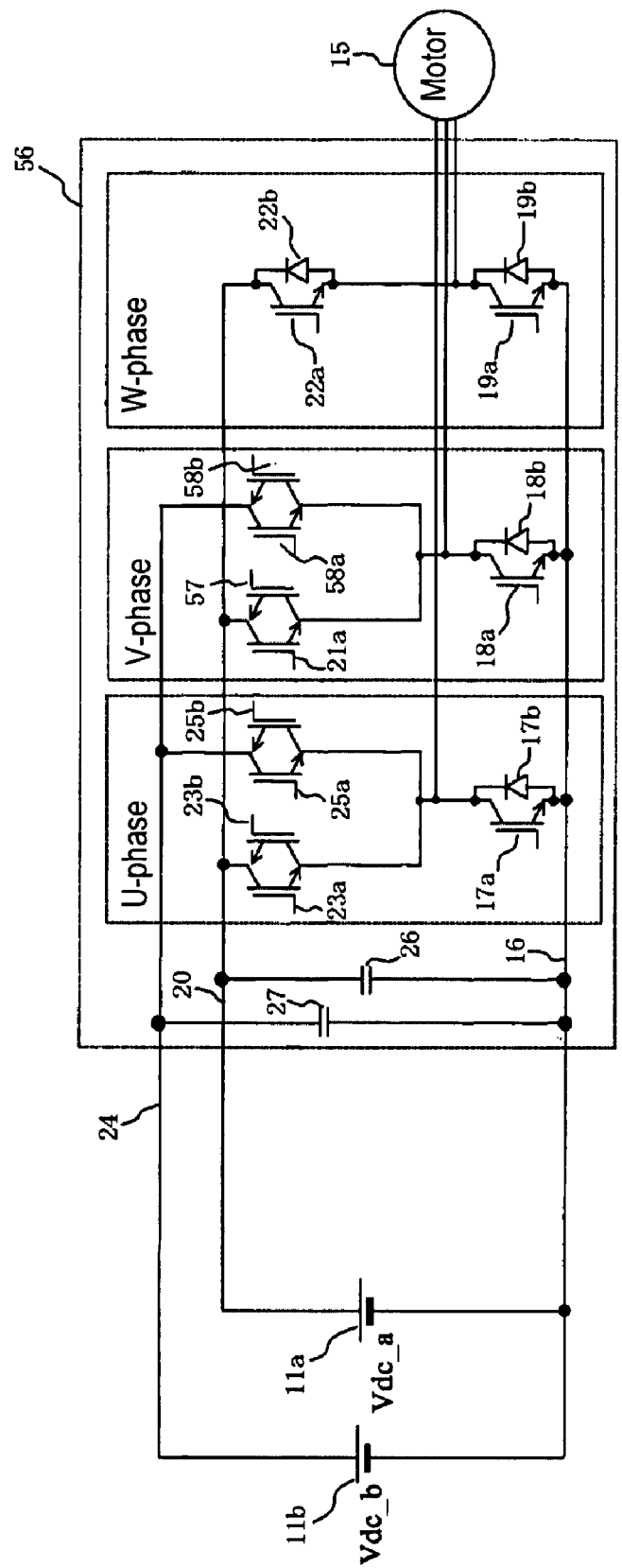
FIG. 18 is a circuit diagram illustrating in additional detail the electric power converter shown in FIG. 17.

FIG. 18 is a circuit diagram illustrating details of the electric power converter 56 shown in FIG. 17. Positive electrode bus line 20 of DC power source 11a and the V-phase terminal of motor 15 are connected to each other via a group of semiconductor switches 21a, 57. Positive electrode bus line 24 of DC power source 11b and the V-phase terminal of motor 15 are connected to each other via two semiconductor switches 58a, 58b that allow control of bidirectional conduction.

That is, between positive electrode bus line 20 and the V-phase terminal of motor 15, in place of diode 21b, semiconductor switch 57 is set. Between positive electrode bus line 24 and the V-phase terminal of motor 15, a group of two semiconductor switches 58a, 58b are newly set. The remaining features of the arrangement and operation are the same as those in electric power converter 12 as shown in FIG. 1.

In this second embodiment, the arithmetic operation of the modulation rate of the V-phase is not performed using multiplier 40 as shown in FIG. 6, and the operation is performed by way of an electric power control/modulation rate arithmetic operation part 29 with the same arrangement as that of electric power controlling/modulating arithmetic operation part 29 that performs the electric power control/modulation rate arithmetic operation of the U-phase according to FIG. 5. Then, the voltage offset compensation operation is also performed in the same way for the U-phase.

In the following, an explanation is given regarding the electric power conversion control system in a third embodiment of the invention. An explanation is given only for the differences between it and the first embodiment. In this third embodiment, the arithmetic operation in determining the voltage offset compensation value of the electric power converter is partially different from that of the electric power converter 12 in the first embodiment.

Figure 19:
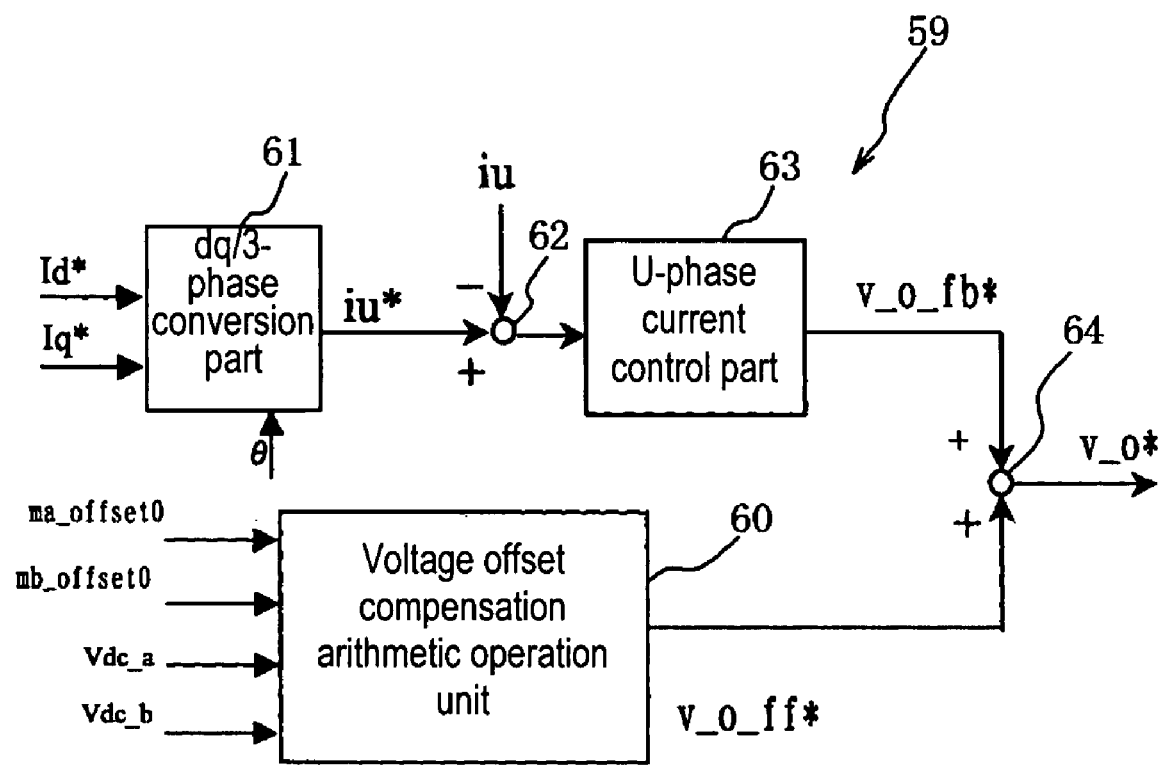
FIG. 19 is a block diagram illustrating the modulation rate offset arithmetic operation part according to a third embodiment of the invention.

FIG. 19 is a block diagram illustrating the modulation rate offset arithmetic operation part 59 in the third embodiment. Voltage offset arithmetic operation part 59 has voltage offset compensation arithmetic operation unit 60, dq/3-phase conversion part 61, subtractor 62, U-phase current control part 63 and adder 64.

Voltage offset compensation arithmetic operation unit 60 performs the same arithmetic operation as that of voltage offset compensation arithmetic operation unit 46 in the first embodiment as shown in FIG. 8, and it outputs feedforward voltage offset compensation value $v\_o\_ff^*$. In addition, with feedback control of the phase current, U-phase current control part 63 computes feedback voltage offset compensation value $v\_o\_fb^*$. Here, from d-axis current instruction value $id^*$ and q-axis current instruction value $iq^*$ as well as phase θ, coordinate transformation is performed by dq/3-phase conversion part 61. Then, phase current instruction value $iu^*$ of the U-phase is determined. Using subtractor 62, the difference from U-phase phase current iu detected by a current sensor is computed, and, by means of proportional-integration (P-I) control, U-phase current control is performed to determine $v\_o\_fb^*$. Then, using adder 64, voltage offset compensation values $v\_o\_ff^*$ and $v\_o\_fb^*$ are added to determine modulation rate offset value $v\_o^*$.

In this way, by computing the offset value by means of current feedback control while the offset value is computed from the voltage of the power source and the offset in the modulation rate, even if there is an undetermined external disturbance voltage in addition to a difference in the output voltage of Δvu_out_ave due to the ON resistance of the switch and the ON/OFF time delay or the like, the offset portion of the voltage is compensated by the feedback control of the current. The output voltage average value of the U-phase becomes equal to that of the other phase. Consequently, it is possible to suppress the offset of the current in each phase, and it is possible to allot the power of the power source without generation of torque ripple and without a decrease in efficiency.

Figure 20:
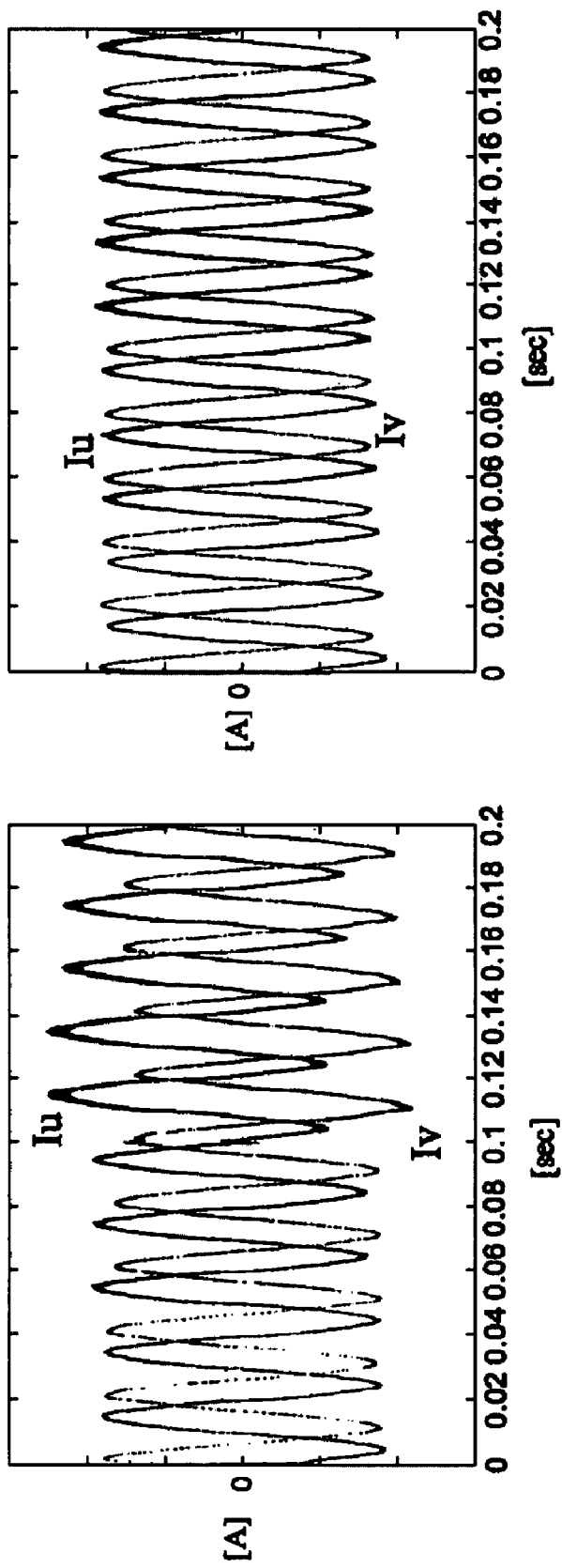
FIG. 20a is a phase current waveform illustrating the case when voltage offset compensation is not performed.
FIG. 20b is a phase current waveform illustrating the case wherein a voltage offset value is added.

FIG. 20a is a waveform diagram illustrating the case when voltage offset compensation is not performed by means of current feedback control, and FIG. 20b is a waveform diagram illustrating the case when addition is performed for the voltage offset compensation value in this embodiment. In the waveform of the phase current before addition of the voltage offset compensation value, in company with a change in electric power distribution proportion rto_pa, an offset current appears in the waveform of the phase current as shown in FIG. 20a. In the waveform of the phase current when addition is performed for the voltage offset compensation value in this embodiment, no offset current appears as shown in FIG. 20b, and suppression of current offset can be seen.

Next, an explanation is given regarding the effect of the third embodiment. This embodiment has a portion that detects the phase current of the phase that generates pulses from the plural power sources and synthesizes them for output. Also, feedback control is computed from the difference between the phase current instruction value and phase current of that phase. The output of this feedback control is taken as the offset value. As a result, without newly detecting the output error voltage, it is possible to allot the power of the power sources by means of information stored in the controller without generation of torque ripple and without a decrease in efficiency.

Also, this embodiment has a portion that detects the phase current of the phase that generates pulses from the plural power sources and synthesizes them for output. Another portion extracts the DC current component of that phase current from the detection value of that phase current. Feedback control is computed from the difference between the DC current instruction value and the DC current component of that phase current. The output of this feedback control is taken as the offset value. Consequently, without newly detecting the output error voltage, it is possible to allot the power of the power sources by means of information stored in the controller without generation of torque ripple and without a decrease in efficiency.

Also, this embodiment has a portion that detects the phase current of the phase that generates pulses from the plural power sources and synthesizes them for output. This embodiment also computes the offset value as the sum of the offset value as the output of the arithmetic operation from the difference between the phase current instruction value and the phase current of the phase that generates pulses from the plural power sources by means of feedback control and the offset value computed from the power source voltages of the plural power sources, the average value of the pulse width instruction values of the power sources and the average value of the pulse width instruction values of the other phase.

As a result, without newly detecting the output error voltage, it is possible to allot the power of the power sources by way of information stored in the controller without generation of torque ripple and without a decrease in efficiency. Also, because current feedback control is performed for the offset current that cannot be compensated only by the offset value computed from the voltage value and the allotment proportion, this is preferable due to further reduction in the offset current. Also, compared with the case of feedback control of current alone, it is possible to improve the response property in suppressing the offset current.

An explanation is next given regarding the electric power conversion control system in the fourth embodiment of the invention. The electric power converter of the control system in the fourth embodiment is different from the electric power converter in the third embodiment with respect to the portion from the feedback control of the phase current to compute $v\_o\_fb^*$.

Figure 21:
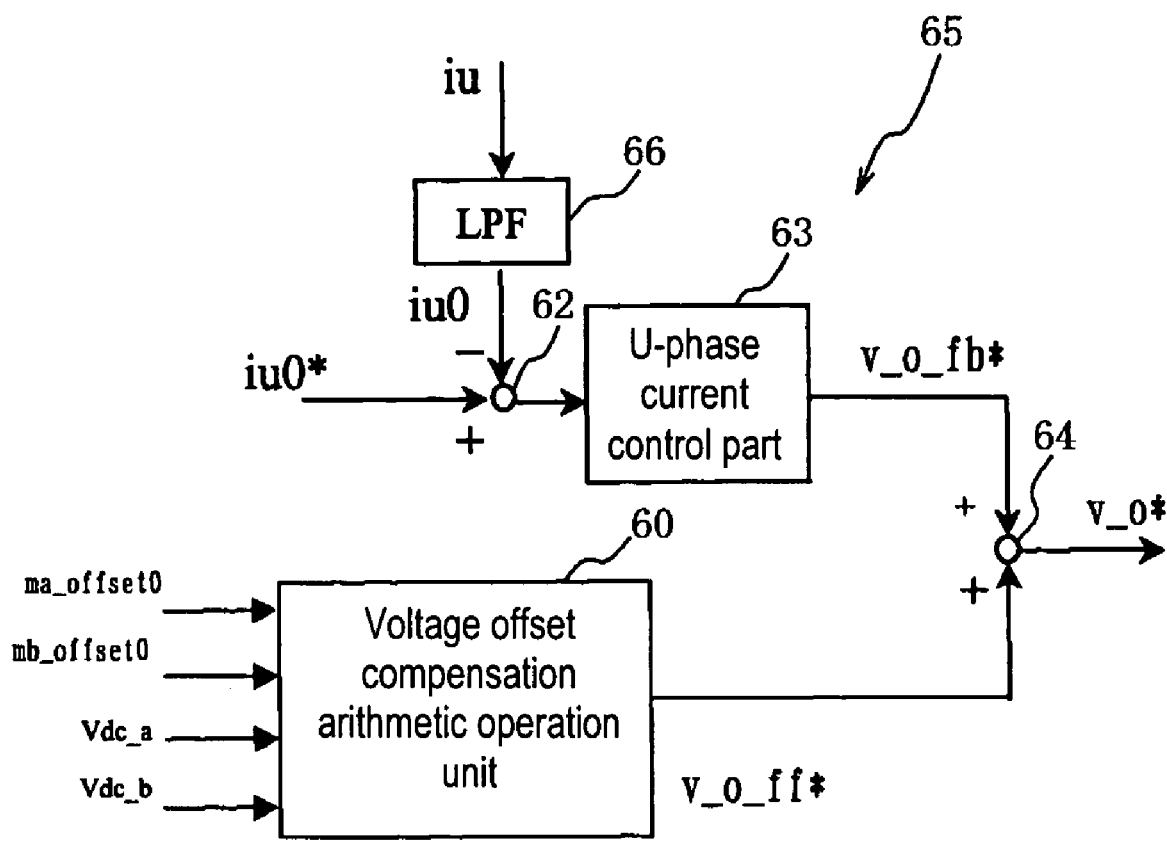
FIG. 21 is a block diagram illustrating the modulation rate offset arithmetic operation part according to a fourth embodiment of the invention.

FIG. 21 is a block diagram illustrating the modulation rate offset arithmetic operation part 65 in the fourth embodiment. Modulation rate offset arithmetic operation part 65 has voltage offset compensation arithmetic operation unit 60, low-pass filter (LPF) 66, subtractor 62, U-phase current control part 63 and adder 64.

Voltage offset compensation arithmetic operation unit 60 outputs voltage offset compensation value v_o_ff*. LPF 66 lets U-phase current iu detected by the current sensor pass through it, and outputs current value iu0. Current value iu0 becomes the value obtained by extraction of the DC current component contained in U-phase current iu. After determining the difference between current value iu0 and instruction value iu0* of the DC current component of the U-phase using subtractor 62, U-phase current control consisting of proportional-integration (P-I) control is performed to determine feedback voltage offset compensation value v_o_fb* using U-phase current control part 63. Here, instruction value iu0*=0. Then, feedforward voltage offset compensation value v_o_ff* and feedback voltage offset compensation value v_o_fb* are added using adder 64 to determine modulation rate offset value v_o*.

In this way, by extracting the DC current component contained in the phase current, and controlling to 0 with feedback control, the offset current contained in the phase current can be controlled at nearly 0. As a result, it is possible to allot the power of the power sources without generation of torque ripple and without a decrease in efficiency.

In the following, an explanation is given regarding the electric power conversion control system in the fifth embodiment of the invention. The electric power converter in the fifth embodiment differs from the electric power converter in the first embodiment with respect to the arrangement of the electric power control/modulation rate arithmetic operation part.

Figure 22:
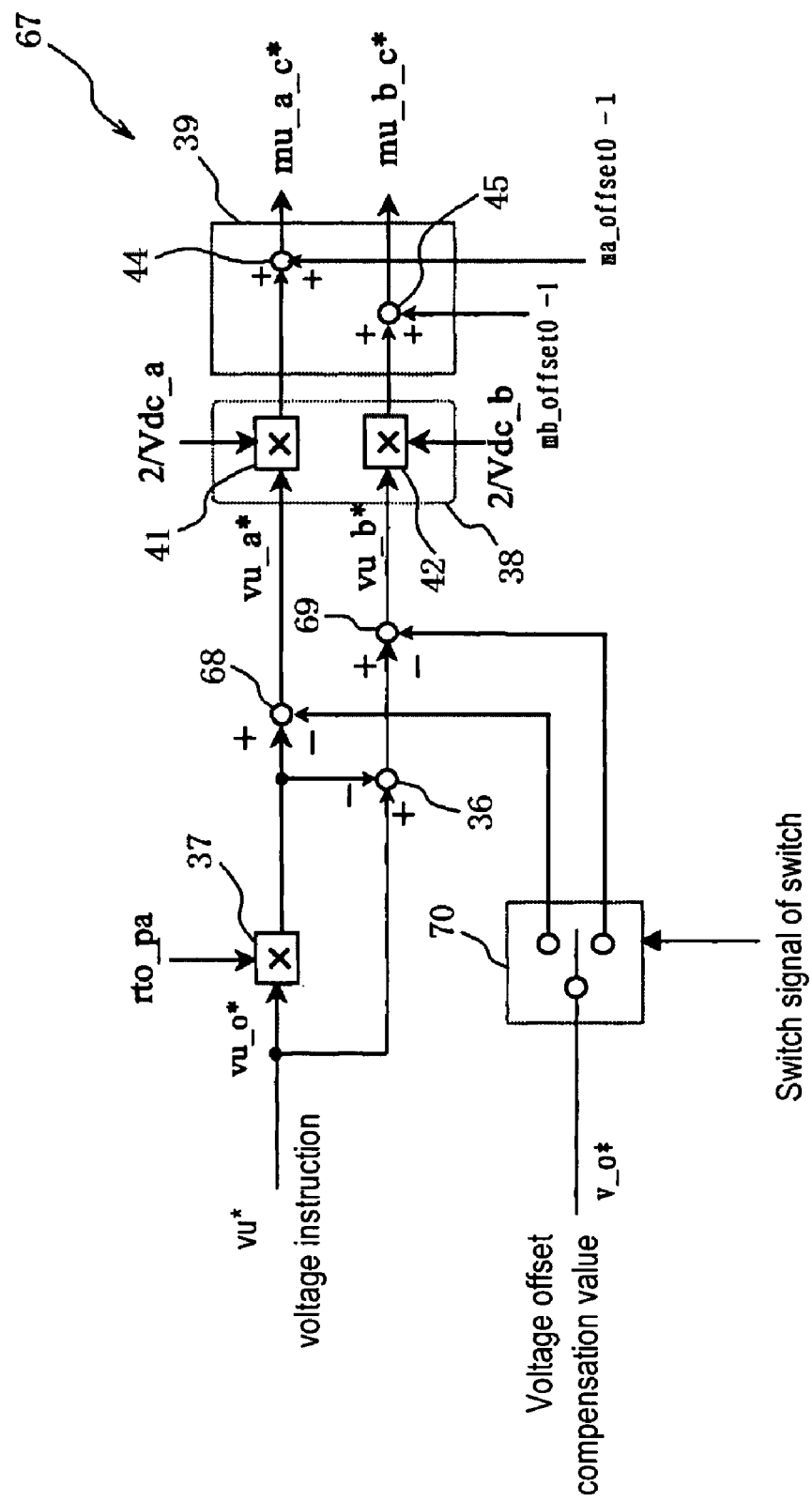
FIG. 22 is a block diagram illustrating the electric power control/modulation rate arithmetic operation part according to a fifth embodiment of the invention.

FIG. 22 is a block diagram illustrating the electric power control/modulation rate arithmetic operation part 67 in the fifth embodiment. Electric power control/modulation rate arithmetic operation part 67 has multiplier 37, subtracters 36, 68, 69, modulation rate arithmetic operation part 38, modulation rate amendment (or correction) part 39 and switch 70.

Using switch 70, selection is made between adding computed voltage offset compensation value v_0* to DC power source 11a or to DC power source 11b. That is, after the output from switch 70 is input to subtracter 68 or subtracter 69 for arithmetic operation, voltage instruction value vu_a* on the side of DC power source 11a or voltage instruction value vu_b* on the side of DC power source 11b is input to modulation rate arithmetic operation part 38. Switching by switch 70 is performed with a switch selecting signal that selects the power source having the higher voltage between DC power source 11a and DC power source 11b.

By adding compensation voltage on the side of the power source with tolerance in the output voltage, it is possible to realize a voltage instruction by using the power source having a higher voltage with tolerance in the output of voltage pulses corresponding to the offset value. For example, the case of a power source with tolerance among plural power sources can be coped with according to the residual quantity of the electric power, and it is possible to perform compensation control in a wide operating range.

Next, an explanation is given regarding the effects of the fifth embodiment.

In the fifth embodiment, the phase voltage instruction value of the phase that generates pulses from the plural power sources and synthesizes them for output is obtained by adding or subtracting the offset value to/from any of the phase voltage instruction values allotted to any of the power sources. Consequently, it is possible to realize voltage instruction using a power source with tolerance in output of the voltage pulses corresponding to the offset value among several power sources.

Also, the phase voltage instruction value of the phase that generates pulses from the plural power sources and synthesizes them for output is obtained by adding or subtracting the offset value to/from a phase voltage instruction value generated from the power source having the highest power source voltage among the power sources. Because of this, it is possible to realize a voltage instruction using a power source with tolerance in output of the voltage pulses corresponding to the offset value among several power sources.

The electric power conversion control system in a sixth embodiment of the invention is next discussed. The arrangement of the torque control part 77 in the electric power conversion control system 75 in the sixth embodiment is different from the electric power conversion control systems according to the other described embodiments.

Figure 23:
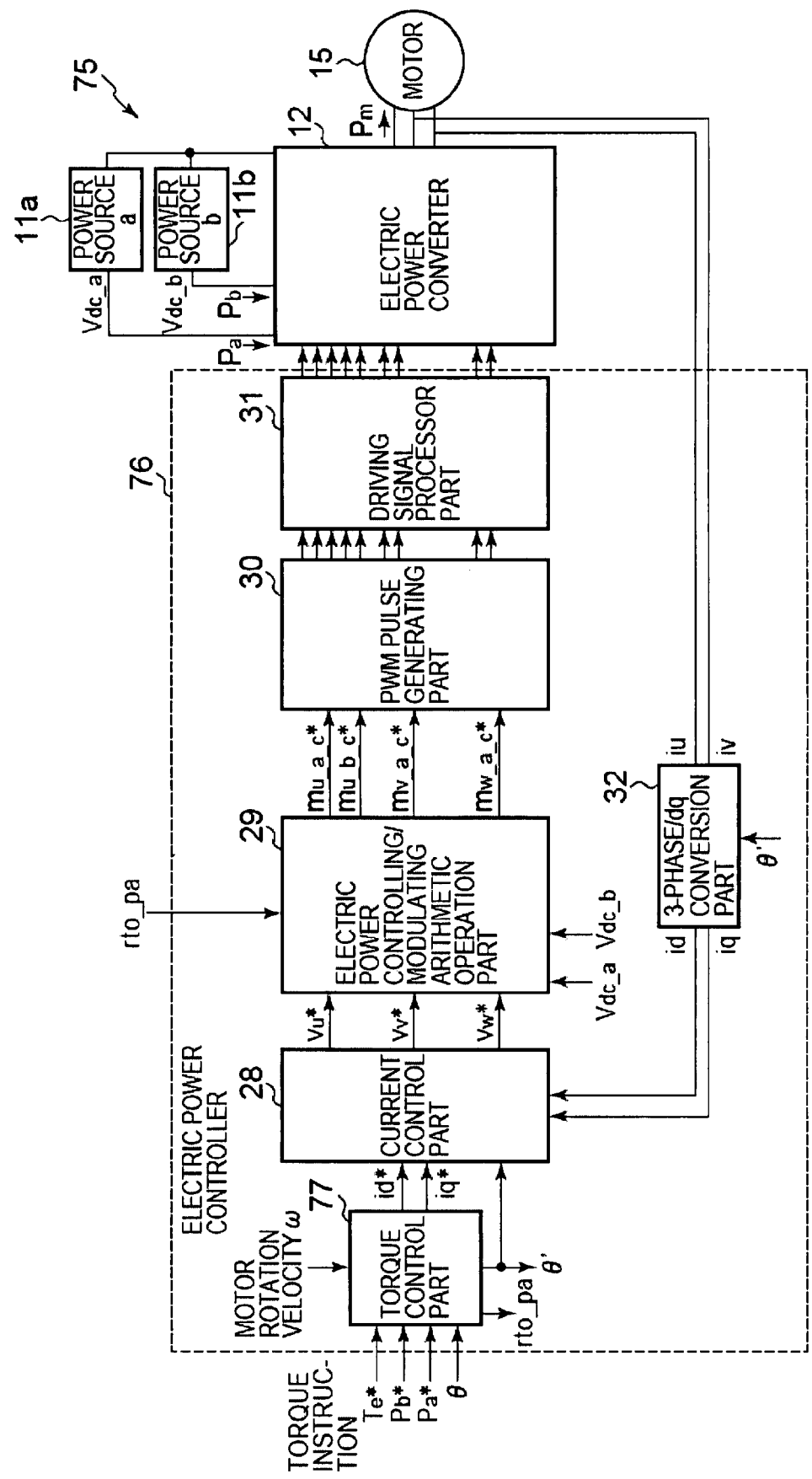
FIG. 23 is a block diagram illustrating the components of the electric power conversion control system according to a sixth embodiment of the invention.

FIG. 23 is a block diagram illustrating the arrangement of the electric power conversion control system 75 in the sixth embodiment. Electric power conversion control system 75 has torque control part 77 in electric power controller 76 instead of torque controller 13. The remaining features of the arrangement and operation are the same as those of electric power conversion control system 10 in the first embodiment.

Figure 24:
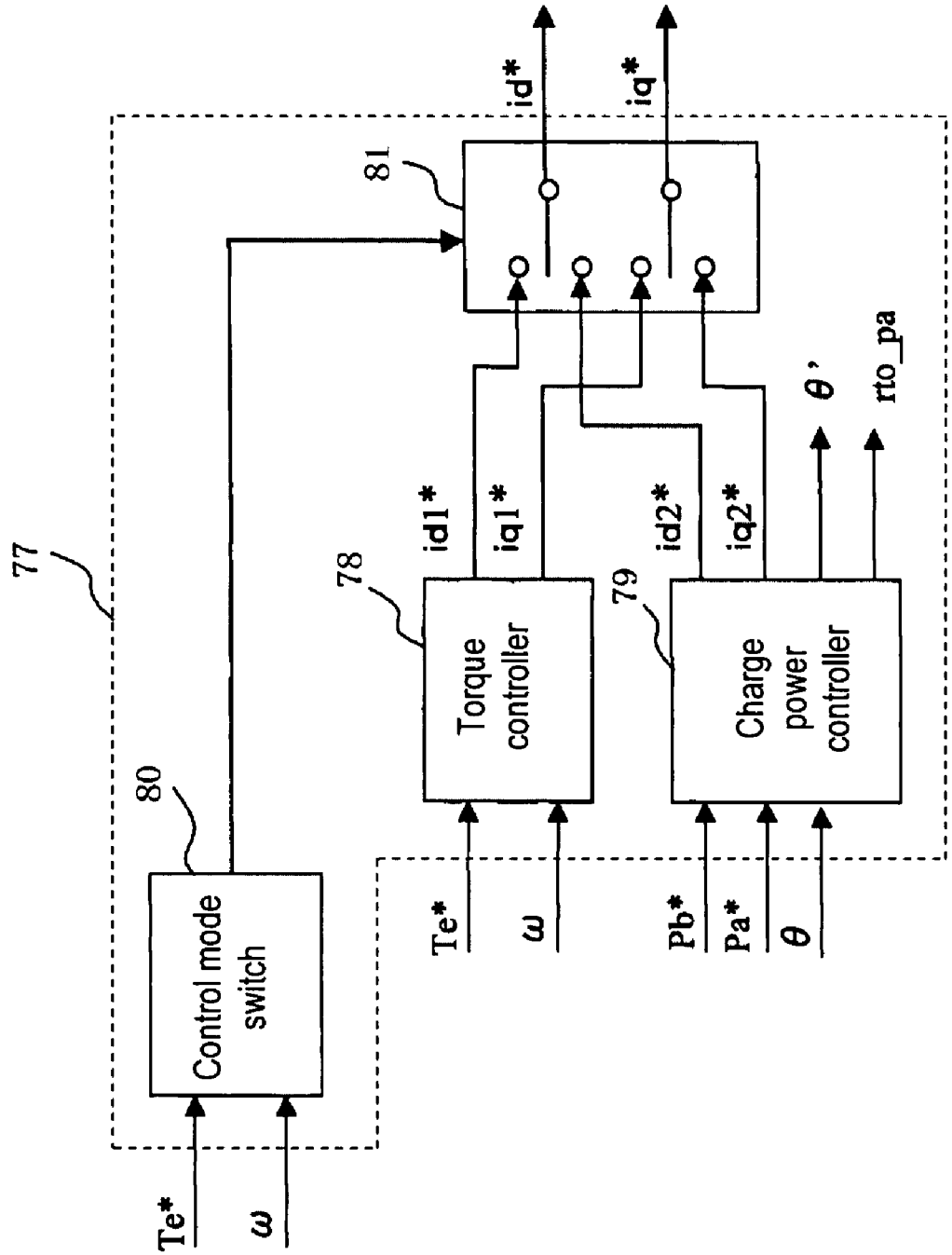
FIG. 24 is a block diagram illustrating in detail the components of the torque control part shown in FIG. 23.

Torque control part 77 computes d-axis current instruction value id* and q-axis current instruction value iq* of motor 15 from torque instruction value Te* and motor rotation velocity ω applied from the outside, as well as electric power instruction value Pa* of DC power source 11a, electric power instruction value Pb* of DC power source 11b and electrical angle θ of motor 15. A block diagram illustrating the details of the torque control part 77 is shown in FIG. 24.

As shown therein, torque control part 77 has torque controller 78, charge power controller 79, control mode switch 80 and current instruction value switch 81. Torque controller 78 takes as reference a map that has Te* and ω as axes and is prepared beforehand to output id1*, iq1*. charge power controller 79 takes electric power instruction values Pa*, Pb* and electrical angle θ as inputs, and outputs id2* and iq2*. At the same time, charge power controller 79 outputs electrical angle θ' and electric power distribution target value rto_pa of DC power source 11a.

Also, when both the magnitude of the torque and rotation velocity c are near 0, the control mode switch 80 selects id2*, iq2* output from charge power controller 79. Otherwise, outputs id1*, iq1* from torque controller 78 are selected.

In charge power controller 79, from electric power instruction value Pa* of DC power source 11a and electric power instruction value Pb* of DC power source 11b, electric power distribution target value rto_pa is first computed using the following formula:

$$rto\_pa = Pa^* / (Pa^* + Pb^*)$$

Figure 25:
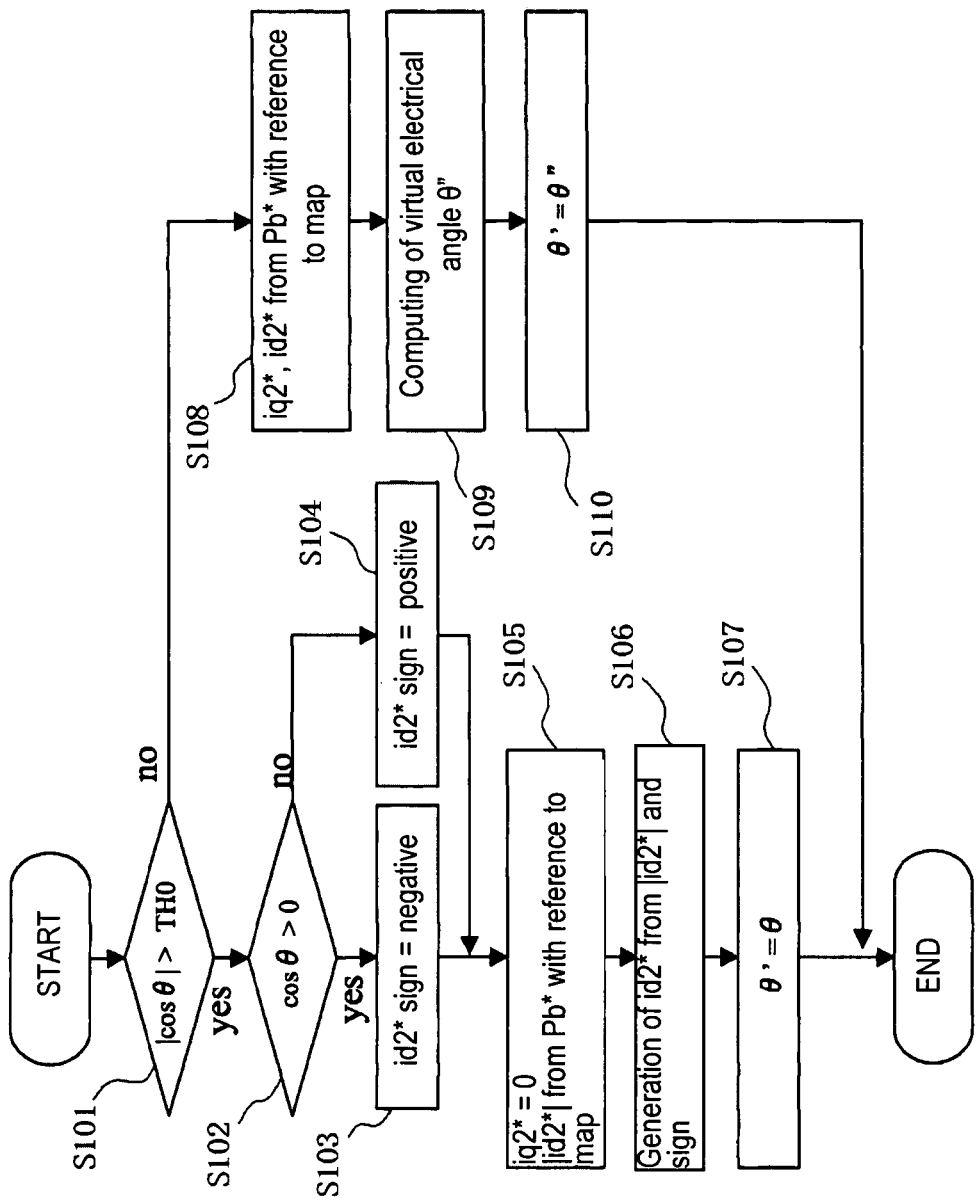
FIG. 25 is a flow chart illustrating processing of the electric power controller in the sixth embodiment.

FIG. 25 is a flow chart illustrating the processing flow of the electric power controller 76 in the sixth embodiment. When the current instruction value and electrical angle θ' are generated, |cos θ| computed from electrical angle θ of motor 15, which angle is obtained from the position sensor of the motor, is compared with prescribed value TH0 to judge whether |cos θ| is larger than TH0. That is, in step S101, a query is formed as |cos θ|>TH0. The value of TH0 is explained later. When cos θ is equal to 0 or near 0, the d-axis current flowing in the U-phase is very small, so it is difficult to control charging using only the d-axis current, and this value is set for judging whether it is possible to control charging by means of the d-axis current alone.

If the judgment result, i.e., the response to the query |cos θ|>TH0 is yes, the sign of cos θ is judged in step S102. When cos θ is positive in response to the query cost θ>0?, the sign of id2* is set negative in step S103. If cos θ is not positive in step S102, the sign of id2* is set positive in step S104. Next, in step S105, in order to ensure that motor 15 does not generate a torque, iq2* is set as iq2*=0. Also, id2* is generated with reference to a map based on electric power instruction value Pb* of DC power source 11b. This map is a one-dimensional map that outputs the magnitude of id2*, and it is prepared experimentally beforehand and is stored inside charge power controller 79.

Current instruction value id2* is next generated in step S106 from the sign information and the size of id2*. Then, as electrical angle θ' for use in coordinate transformation of the d·q axis current control, the electrical angle θ obtained in step S107 by the position sensor of motor 15 is substituted (θ'=θ) for use. Processing is then stopped.

On the other hand, if instead |cos θ| is less than or equal to TH0 in response to the query of step S101 (NO), id2* and iq2* are generated with reference to a map in step S108 based on electric power instruction value Pb* of DC power source 11b. This map is also prepared experimentally beforehand and stored in electric power controller 79. Here, any values may be used as id2* and iq2*. As to be explained later, by using the virtual electrical angle from id2* and iq2*, voltage instruction value vu* of the U-phase, voltage instruction value vv* of the V-phase and voltage instruction value vw* of the W-phase are generated such that an AC current that vibrates at high frequency flows. On the other hand, by means of the electric power allotment control explained above, feeding/charging of each power source is compensated in a feedback way. As a result, charging can be performed for any values set at id2*, iq2*. In order to facilitate explanation, just like the case where |cos θ|>TH0, id2* is generated from the map based on electric power instruction value Pb*, and iq2* is set at 0.

In next step S109, virtual electrical angle θ" is computed. Virtual electrical angle θ" has a value that is computed successively based on the frequency of the virtual electrical angle. The virtual electrical angle frequency is set in the range of several hundred Hz to several kHz. Then, in step 110, as electrical angle θ' for use in coordinate transformation of the d·q axis current control, virtual electrical angle θ" is substituted according to θ'=θ". Then processing comes to an end. In this case, instead of control of the d·q axis current commonly known for the motor 15, current control is performed in a rotating coordinate system that undergoes virtual rotation.

Next, an explanation is given regarding the background of this control. First, the following relationship exists between the d·q axis current and the 3-phase AC current:

$$\begin{bmatrix} i_u \\ i_v \\ i_w \end{bmatrix} = \begin{bmatrix} \cos\theta & -\sin\theta \\ \cos\left(\theta - \frac{2}{3}\pi\right) & -\sin\left(\theta - \frac{2}{3}\pi\right) \\ \cos\left(\theta + \frac{2}{3}\pi\right) & -\sin\left(\theta + \frac{2}{3}\pi\right) \end{bmatrix} \begin{bmatrix} i_d \\ i_q \end{bmatrix}$$

For electric power converter 12 as shown in FIG. 1, the circuit arrangement is such that the U-phase voltage is generated from two DC power sources 11a, 11b. It is possible to feed the electric power of DC power source 11b to motor 15 or to charge electric power only via the circuit of the U-phase.

While motor 15 is stopped near velocity 0, as DC power source 11b is charged without generating torque for motor 15, control may be performed such that iq=0.

Here, with iq=0, in consideration of current iu of the U-phase, one has:

$$iu = id \cos\theta.$$

That is, it can be seen that iu is determined by cos θ determined from d-axis current id and the position of the rotor. Regarding the absolute value of id, |id|, it is possible to select a prescribed value based on the electric power allotment ratio. On the other hand, in order to avoid influencing the torque by the sign of the id, it is possible to select any sign. Here, the sign is determined in consideration of the movement direction of the electric power. That is, in the direction of charging of DC power source 11b, current may flow in the negative direction of the U-phase current such that current flows in the direction from motor 15 to electric power converter 12. The sign of id is selected to ensure that the sign of iu is negative. Consequently, if cos θ is positive, id is selected negative. If cos θ is negative, id is selected positive. On the other hand, when DC power source 11a is charged, the sign of id may be selected such that the sign of iu becomes negative or the sign of iu becomes positive. Selection of sign is valid in the case when the charge/discharge phase is limited as in this embodiment.

On the other hand, judging from this formula, when cos θ is 0, no matter how id is selected it is not possible to manipulate the electric power of DC power source 11b via the U-phase. When cos θ is 0 or is near 0, iq, id are taken as high frequency current, and the motor current is controlled while the average torque of motor 15 is set at 0. If id, iq have a sufficiently high frequency, the average torque in a short time becomes 0 although an instantaneous torque is generated in motor 15 so that motor 15 does not rotate in one direction.

That is, by giving a virtual electrical angle of vibration at a high frequency as mentioned, it is possible for the average torque to be 0, and current flows in the U-phase.

Figure 26:
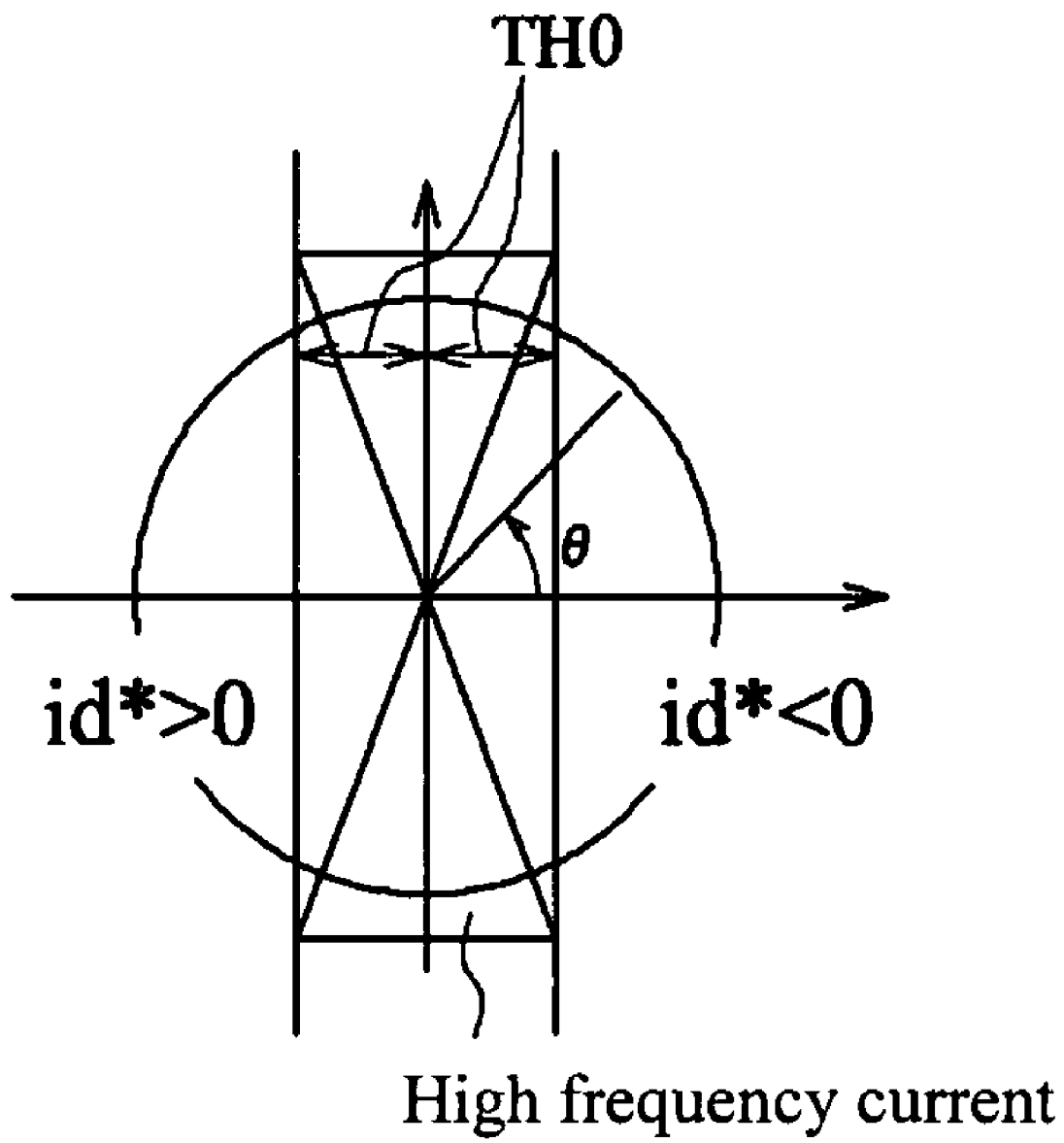
FIG. 26 is a diagram schematically illustrating the selection of the sign of the d-axis current and the selection of high frequency current.

FIG. 26 schematically illustrates selection of the sign of the d-axis current and selection of the high frequency current. As shown therein, selection of the sign of d-axis current id and selection of the high frequency current are performed as described above.

Figure 27:
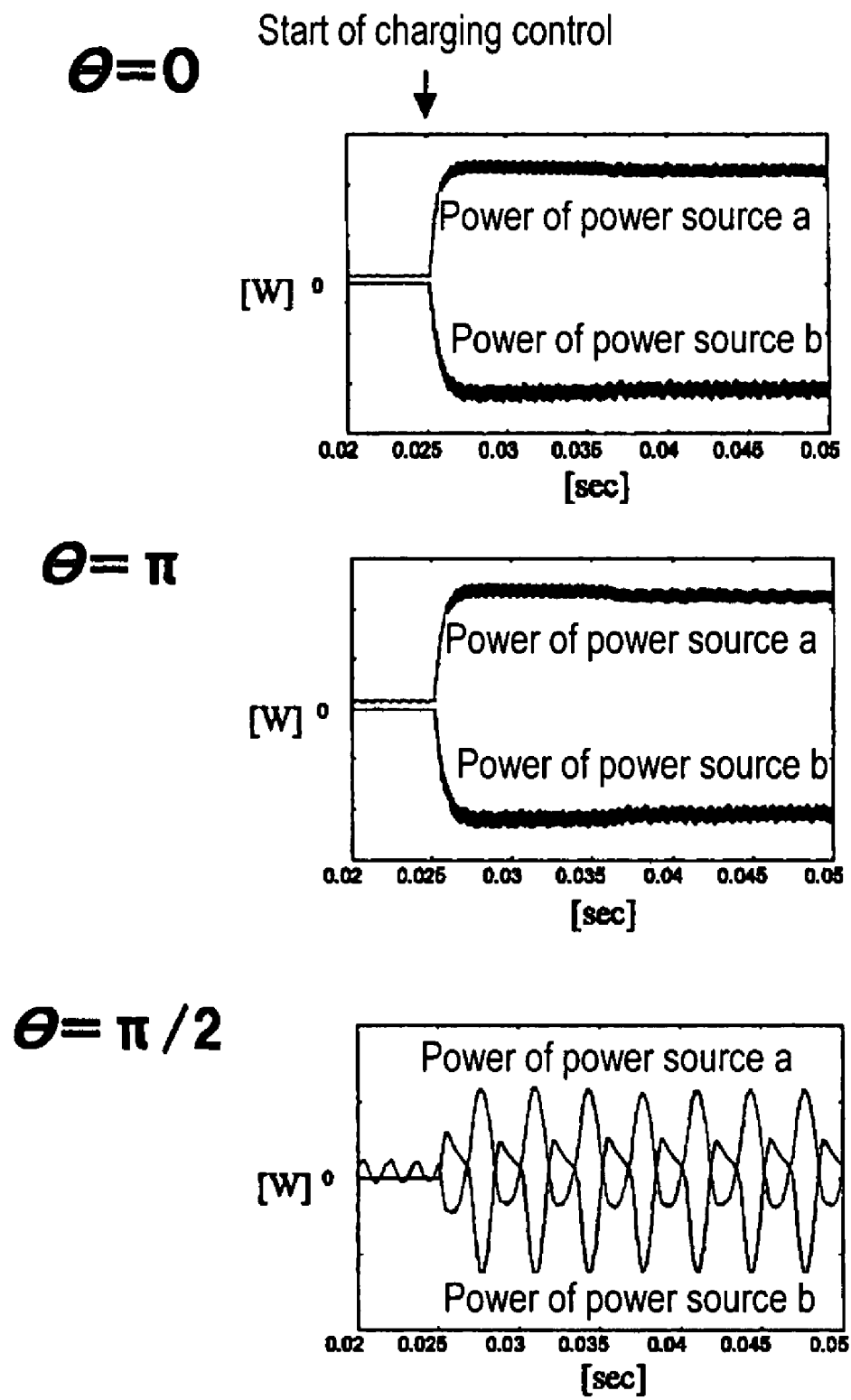
FIG. 27 includes graphs illustrating an example of the result of electric power control in the sixth embodiment.

FIG. 27 illustrates an example of the results of electric power control in the sixth embodiment. As shown, motor 15 is stopped, and the electric power instruction value is set such that DC power source 11a (power source a) feeds electricity while DC power source 11b (power source b) is charged. Accordingly, even if motor 15 is stopped at various electrical angles, it is still possible to control the electric power so that charging is performed from one of DC power source 11a and DC power source 11b to the other.

In this embodiment, the U-phase is the phase that can perform pulse generation from plural power sources. But in the V-phase and W-phase, when the currents of the various phases are selected such that current flows on the path connected to DC power source 11b, it is possible to perform the same electric power control as this embodiment. Also, for all of the phases, it is possible to control the electric power also by flowing current at the virtual electrical angle frequency. As also shown in this embodiment, by switching the virtual electrical angle frequency and the d-axis current, it is possible to reduce the probability of generation of the influence of vibration, magnetic noise, etc., if they become a problem due to variation in the torque of the motor caused by the virtual electrical angle frequency current.

In the following, an explanation is given regarding the effects of the sixth embodiment.

This embodiment has a part that generates a current instruction value for the multi-phase AC motor and the allotment proportions for the power source voltage from the electrical angle, rotation velocity and electric power instruction values of the power sources of the multi-phase AC motor. The output voltage is generated based on the current instruction value for the multi-phase AC motor, and the output voltage is allotted to the power sources. Consequently, even if the prescribed phase has a circuit arrangement wherein pulses are generated from plural power sources and are synthesized for output, because the power feeding current instruction value is generated from the electric power instruction value and the electrical angle and rotation velocity of the motor, no matter what the motor position and velocity are, the power of plural power sources is allotted to the power sources, and it is possible to control the electric power. As a result, even if the motor is stopped, by generation and synthesis of pulses from plural power sources, allotment to plural power sources and charging from one power source to another power source without using a DC/DC converter or the like are still possible.

Also, in this embodiment the part that generates the current instruction value for the multi-phase AC motor and the allotment proportions for the power of the power sources generates the magnitudes of the d-axis current instruction value and the q-axis current instruction value. Together with these values, this embodiment switches the sign of the d-axis current instruction value based on the value of the electrical angle of the multi-phase AC motor. Consequently, by generating the instruction value of the d·q axis current and switching the sign of the d-axis current, it is possible to allot the power for plural power sources to each of the power sources and to control the electric power independent of the position of the motor.

In the sixth embodiment, the sign of the d-axis current instruction value is such that the current path connected to the power source that charges the electric power is selected in the direction of flow of the charging current based on the electric power instruction value for the plural power sources. By selecting the switching of the sign of the d-axis current such that current flows in the path for charging electric power, it is possible to allot the power for plural power sources to each of the power sources and to control the charging electric power of the power sources.

Also, this embodiment has a part that generates the virtual electrical angle of the multi-phase AC motor. The part that generates the current instruction value for the multi-phase AC motor and the allotment proportions for the power of the power sources generates the current instruction value at the virtual electrical angle frequency. By generating the virtual electrical angle of the motor and generating the current instruction value of the virtual electrical angle frequency, current at the frequency of the virtual electrical angle can flow to the motor. As a result, no matter where the rotor of the motor stops, it is possible to allot the power for plural power sources to each of the power sources and to control the charging electric power for the power sources by means of current at the virtual electrical angle frequency.

This sixth embodiment has a part that generates the voltage instruction value in a rotating coordinate system that rotates at the virtual electrical angle based on the motor current instruction value in the rotating coordinate system. The output voltage instruction value is generated by means of coordinate transformation of the voltage instruction value in the rotating coordinate system using the virtual electrical angle in the stationary coordinate system. Consequently, by generating the voltage instruction value in the rotating coordinate system based on the motor current instruction value in the coordinate system rotating at the virtual electrical angle, and by generating the output voltage instruction value by means of coordinate transformation using the virtual electrical angle, even if the frequency of the virtual electrical angle is high, highly precise control of the current at high frequency is possible just as in conventional vector control. Highly precise control of the charging electric power for the power sources is also possible. Further, the motor is an AC motor. If current control is performed using vector control, it is possible to use the controller as is to control the rotating coordinates at the virtual electrical angle, and it is possible to eliminate an increase in the cost of the controller since the number of parts to be added to the controller is decreased.

Also, based on the electrical angle of the multi-phase AC motor, the current instruction value is selected from the magnitudes of the d-axis current instruction value and the q-axis current instruction value, the current instruction value due to switching of the sign of the d-axis current instruction value and the current instruction value at the virtual electrical angle frequency. Consequently, it is possible to allot the power for plural power sources to each of the power sources with only the d-axis and q-axis current, and it is also possible to control the charging electric power for the power sources. In addition, no matter where the motor rotor stops, control of the electric power is still possible by using the current instruction value of the virtual electrical angle frequency.

Next, an explanation is given regarding the electric power conversion control system in the seventh embodiment of the invention. Electric power conversion control system 82 of the seventh embodiment differs from the sixth embodiment that performs pulse generation from plural power sources only in the U-phase in that it uses electric power converter 56 having a circuit arrangement that allows generation of pulses from plural power sources also in the V-phase as described with reference to FIG. 21. The seventh embodiment also has a torque control part 84 with an arrangement different from the torque control part in the sixth embodiment. The other features of the arrangement and operation are the same as those of electric power conversion control system 75 in the sixth embodiment as shown in FIG. 23.

Figure 28:
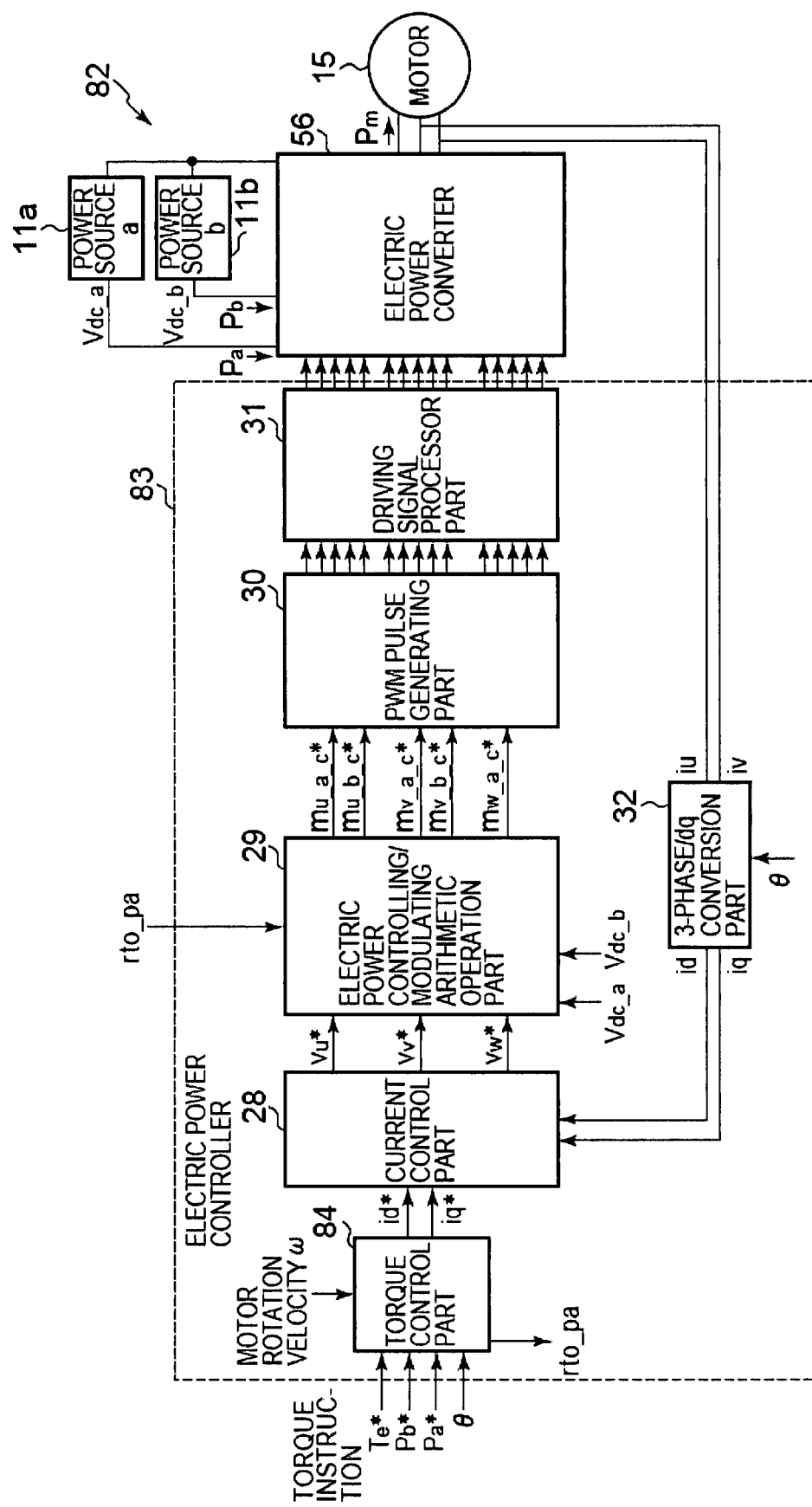
FIG. 28 is a block diagram illustrating the components of the electric power conversion control system in a seventh embodiment of the invention.

FIG. 28 is a block diagram illustrating the arrangement of the electric power conversion control system 82 in the seventh embodiment. As shown in FIG. 28, torque control part 84 in electric power controller 83 is different from torque control part 77 of FIG. 23. Also, electric power conversion control system 82 has electric power converter 56.

Figure 29:
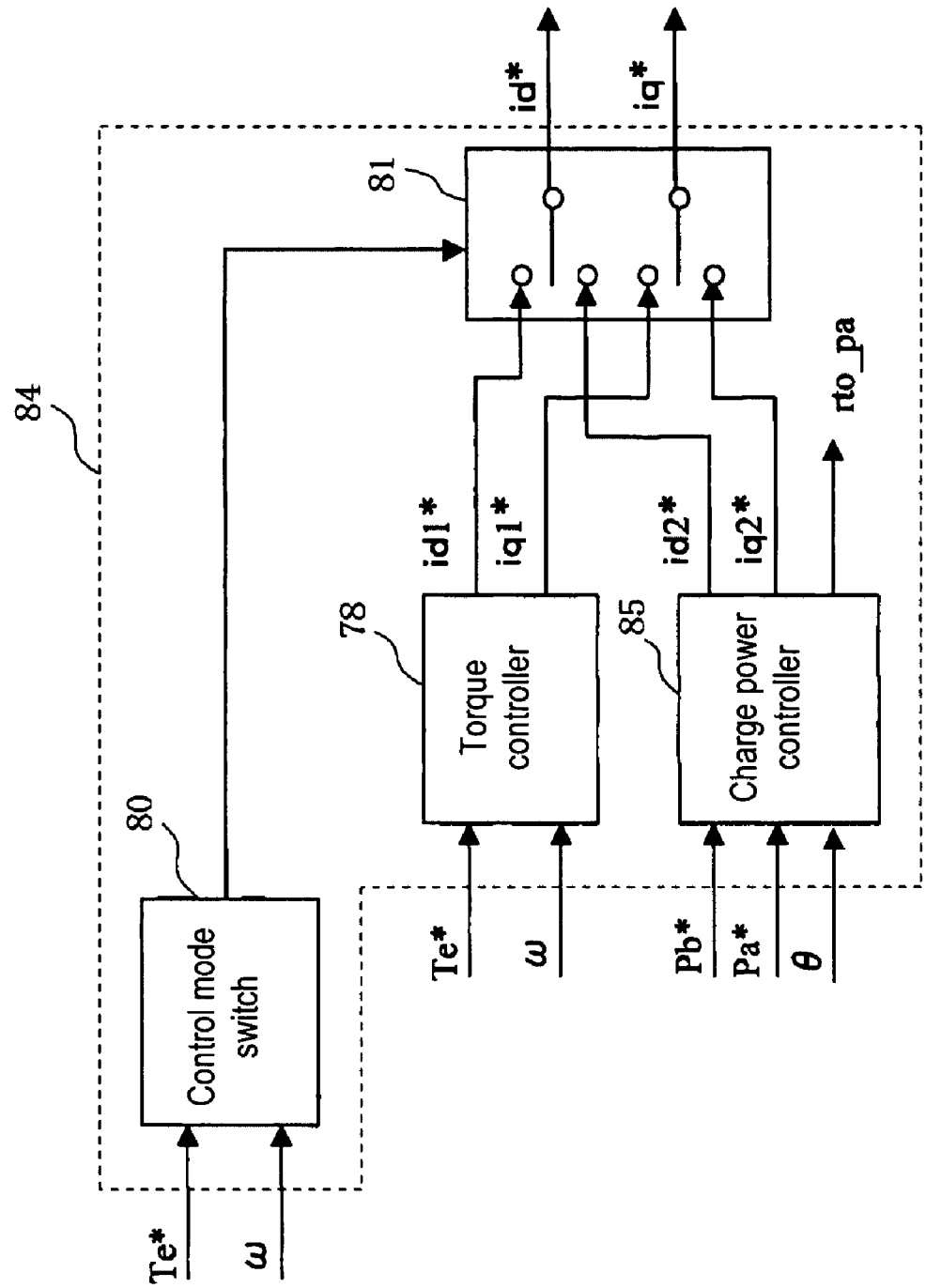
FIG. 29 is a block diagram illustrating in detail the torque control part shown in FIG. 28.

FIG. 29 is a block diagram illustrating in detail the arrangement of the torque control part shown in FIG. 28. Instead of charge power controller 79 previously taught, torque control part 84 has charge power controller 85 without the output of electrical angle θ'. Otherwise, torque control part 84 has the same arrangement as that of torque control part 77 previously described.

Figure 30:
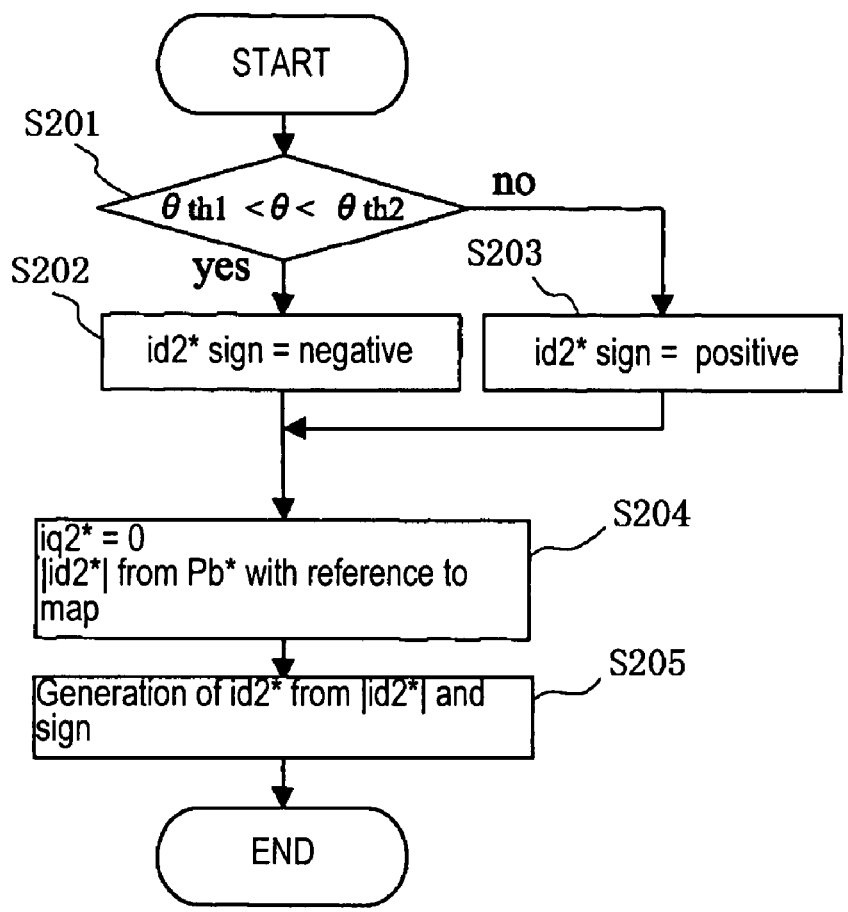
FIG. 30 is a flow chart illustrating processing of the electric power controller in the seventh embodiment.

FIG. 30 is a flow chart illustrating the processing flow of the electric power controller in the seventh embodiment. First, judgment is made as to whether electrical angle θ of motor 15 is smaller than prescribed phase θth2 that is larger than prescribed phase θth1 in step S201. The value of electrical angle θ of motor 15 is obtained from the position sensor of motor 15, and this electrical angle θ is compared with prescribed phases θth1 and θth2. By example, θth1=−π/6 and θth2=5π/6.

As the result of this judgment, if electrical angle θ enters this range (i.e., the response to the query of step S201 is YES), the sign of id2* is taken as negative in step S202, and, if electrical angle θ is out of this range (i.e., the response to the query of step S201 is NO), the sign of id2* is taken as positive in step S203. Then, in step S204, iq2* is set at 0 such that motor 15 generates no torque, and id2* is generated based on electric power instruction value Pb* of DC power source 11b with reference to a one-dimensional map that outputs the magnitude of id2*. This map is prepared experimentally and is stored beforehand inside the device.

Then, from the sign information of id2* and its magnitude |id2*|, current instruction value id2* is generated in step S205. Processing comes to an end.

In this way, by selecting the sign of id2*, current flows from motor 15 to the power source in one of the U-phase and V-phase so that it is possible to charge DC power source 11b. In this way, even if the motor is stopped, allotment control of the electric power including charging of DC power source 11b is still possible.

In this embodiment, the U-phase and V-phase are set as the phases that can generate pulses from plural power sources. However, it is also possible to use a combination of the two remaining phases of the three phases. Prescribed phases θth1, θth2 can be selected to match the phases. Also, when charging is performed from DC power source 11b to DC power source 11a, reverse selection of the sign of id* is possible.

Figure 31:
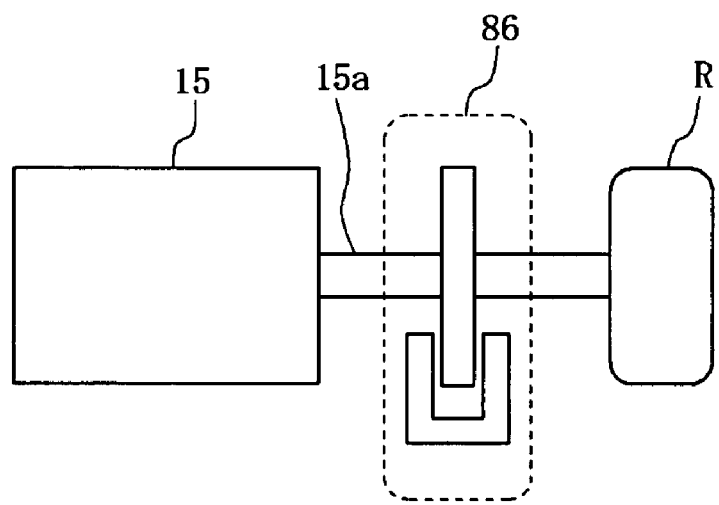
FIG. 31 is a diagram illustrating the braking device installed on the output shaft of the motor in the electric power conversion control system according to the eighth embodiment of the invention.

In the following, an explanation is given regarding the electric power conversion control system in the eighth embodiment of the invention. The electric power conversion control system in the eighth embodiment has a braking device (brake) on the output shaft of the motor 15. FIG. 31 illustrates the braking device installed on the output shaft of the motor 15. Load R is connected to output shaft 15a of motor 15, and braking device 86 for mechanically braking motor 15 is installed at an intermediate point of output shaft 15a.

Figure 32:
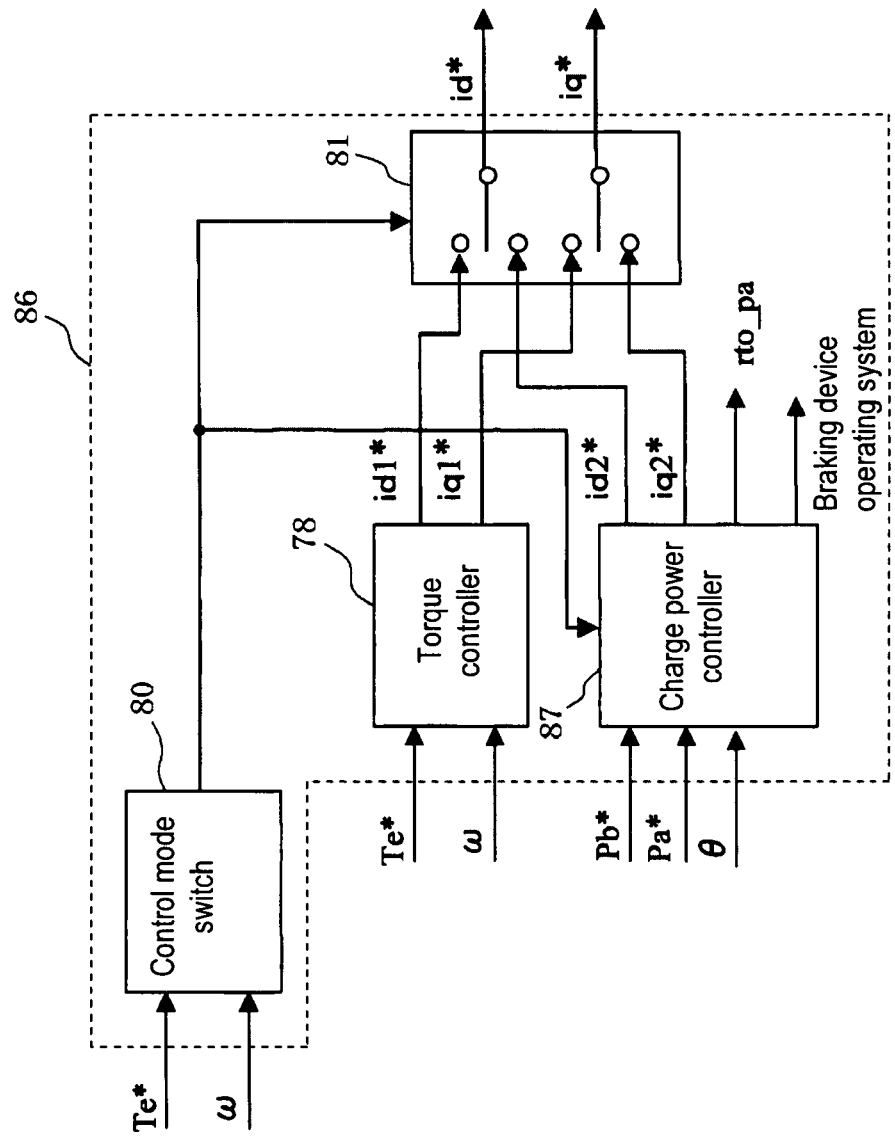
FIG. 32 is a block diagram illustrating in detail the torque control part in the eighth embodiment.

A block diagram shown in FIG. 32 illustrates in detail the torque control part 86 in the eighth embodiment. As shown therein, instead of charge power controller 79, braking device 86 has charge power controller 87. This charge power controller 87 outputs a braking device operating signal as the operating signal of braking device 86 in place of electrical angle θ' output from charge power controller 79.

Figure 33:
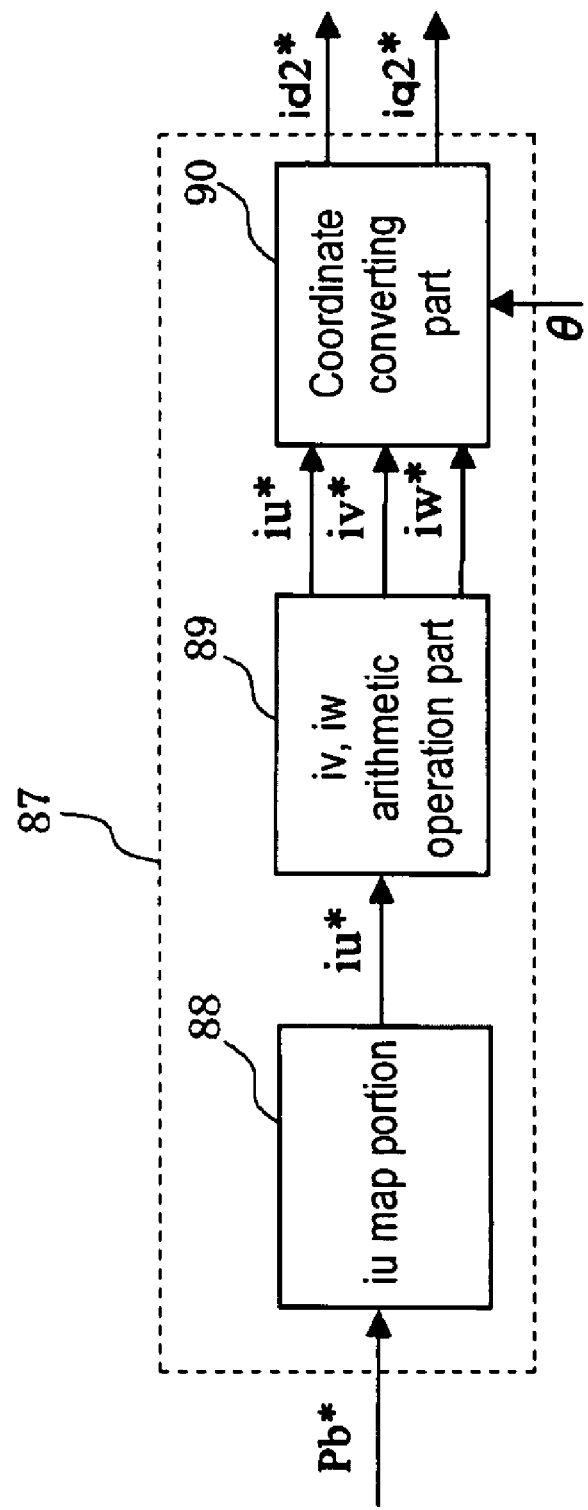
FIG. 33 is a block diagram illustrating the components of the electric power controller shown in FIG. 32.

FIG. 33 is a block diagram illustrating details of the charge power controller 87 shown in FIG. 32. Charge power controller 87 has iu map part 88, iv, iw arithmetic operation part 89 and coordinate converting part 90. Using iu map part 88, and taking the map based on electric power instruction value Pb* as a reference, U-phase current instruction value iu* is determined. Using determined U-phase current instruction value iu*, a negative value map is formed to allow charging of DC power source 11b.

The phase current instruction values of the other phases, that is, V-phase current instruction value iv* and W-phase current instruction value iw* are computed using the following formulas in iv, iw arithmetic operation part 89 so that 3-phase equilibrium is realized:

$iv^*=-iu^*/d;$ and $iw^*=-iu^*/2.$

From current instruction values iu*, iv*, iw* of the various phases and electrical angle θ, current instruction values id2*, iq2* of the d·q axis current are computed using coordinate converting part 90.

Also, under the condition that d·q axis current instruction values id2* and iq2* are selected using control mode switch 80, the operating signal of the braking device output from charge power controller 87 turns braking device 86ON. As a result, even at a position of electrical angle θ such that torque is generated by motor 15, it is possible to keep output shaft 15a stopped without rotation. As a result, it is possible to control charging from one power source to another power source while motor 15 is held as stopped without generating variation in the torque of the motor.

In the following, an explanation is given regarding the electric power conversion control system in a ninth embodiment of the invention. This embodiment has a clutch device in place of the braking device on the output shaft 15a of the motor 15. The remaining features of this embodiment are the same as those in the electric power conversion control system in the eighth embodiment.

Figure 34:
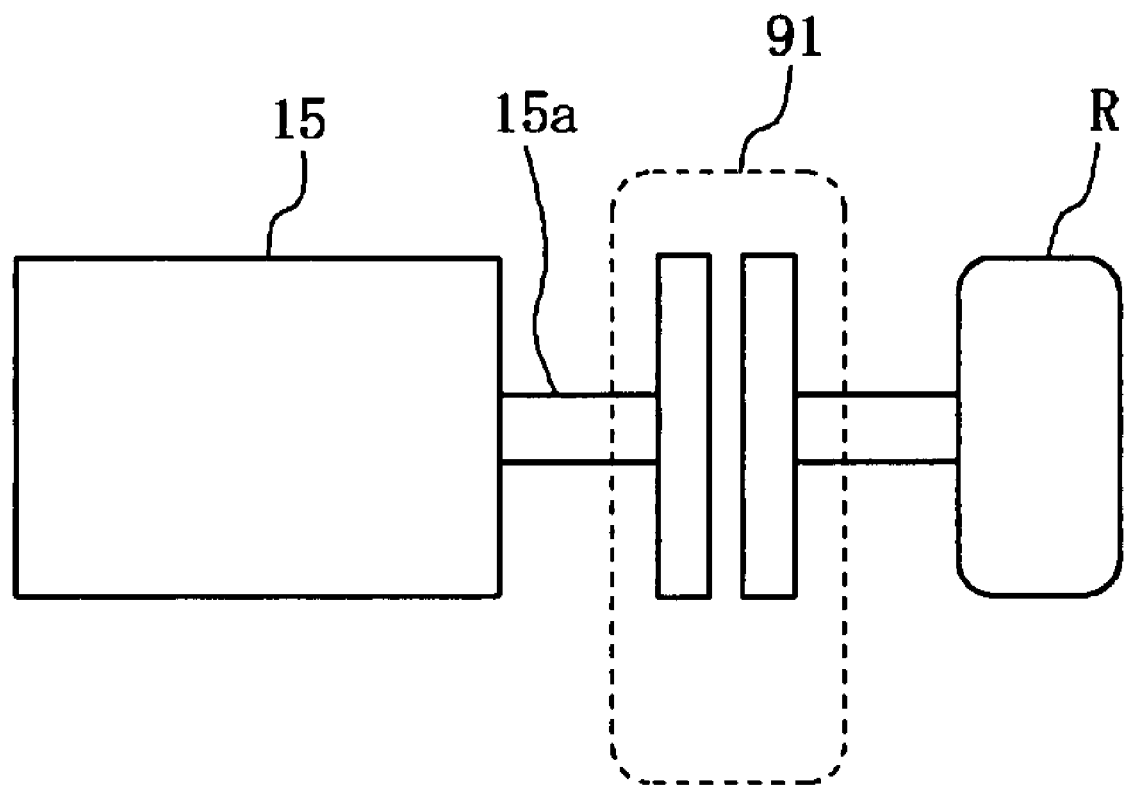
FIG. 34 is a diagram illustrating the clutch device installed on the output shaft of the motor of the electric power conversion control system according to a ninth embodiment of the invention.

FIG. 34 illustrates the clutch device installed on the output shaft of the motor in the ninth embodiment. Load R is connected to output shaft 15a of motor 15 of the electric power conversion control system, and clutch device 91 for mechanically releasing motor 15 and the load shaft is installed at an intermediate point of output shaft 15a.

Figure 35:
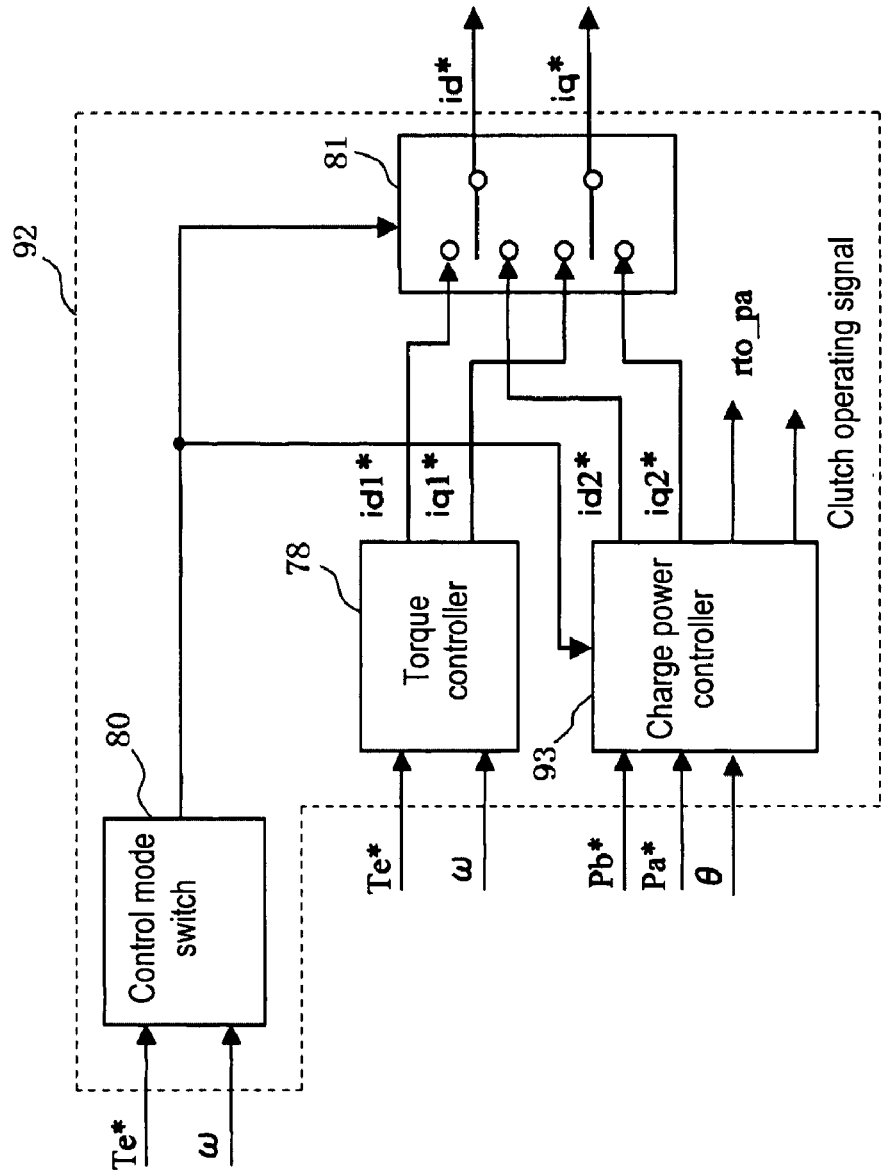
FIG. 35 is a block diagram illustrating in detail the torque control part in the ninth embodiment.

FIG. 35 is a block diagram illustrating in detail the torque control part 92 in the ninth embodiment. Instead of charge power controller 87, torque control part 92 has charge power controller 93. This charge power controller 93 outputs a clutch operating signal as the operating signal of clutch device 91 in place of the braking device operating signal output from charge power controller 87.

Charge power controller 93 receives electric power instruction value Pb* and outputs id2*, iq2* using a map as a reference. Then, just as in the processing of charge power controller 79 in the sixth embodiment (see FIG. 25), |cos θ| computed from electrical angle θ of motor 15 is compared with the prescribed value TH0 to judge whether |cos θ| is larger than TH0.

In response to this query, if |cos θ|>TH0, then iq2* is set to 0, and the sign of id2* is judged. On the other hand, if the relationship |cos θ|>TH0 is not met, the map is taken as a reference, and iq2* is output. At the same time, a clutch operating signal is output, and load R and output shaft 15a of motor 15 are released. Depending on the output of iq2*, a motor torque is generated in rotation. As a result, by controlling the d-axis current, charging control of DC power source 11a and DC power source 11b using an electric power allotment target value is possible.

Figure 36:
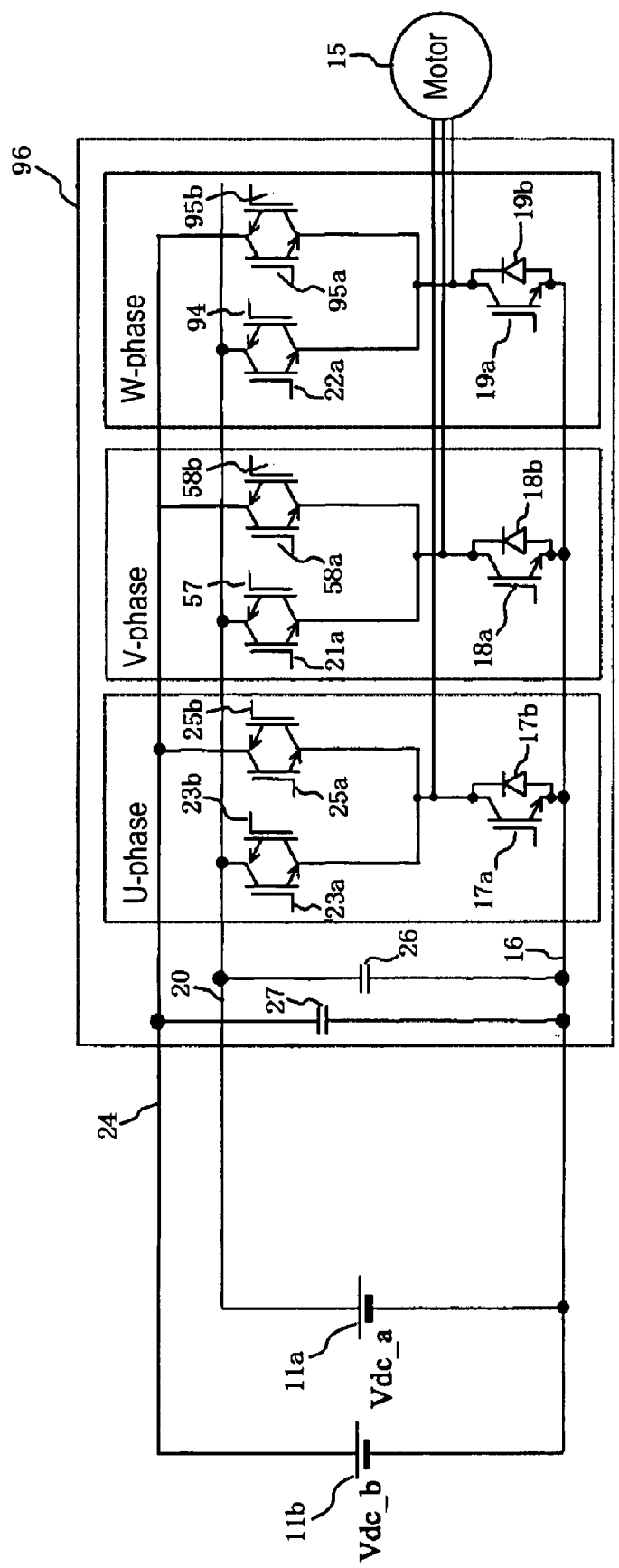
FIG. 36 is a circuit diagram illustrating the electric power converter in a tenth embodiment of the invention.

FIG. 36 is a circuit diagram illustrating the electric power converter in a tenth embodiment of the invention. Electric power converter 96 of the tenth embodiment differs from that as shown in FIG. 36. Electric power converter 96 has positive electrode bus 20 of DC power source 11a and the W-phase terminal of motor 15 connected via a group of semiconductor switches 22a, 94, and it has positive electrode bus 24 of DC power source 11b and the W-phase terminal of motor 15 connected via a group of two semiconductor switches 95a, 95b that allow control of bidirectional conduction.

That is, between positive electrode bus 20 and the W-phase terminal of motor 15, semiconductor switch 94 is set in place of diode 21b. Between positive electrode bus 24 and the V-phase terminal of motor 15, a group of two semiconductor switches 95a, 95b is newly set. The remaining arrangement and operation are the same as those of electric power converter 56 (see FIG. 18).

Figure 37:
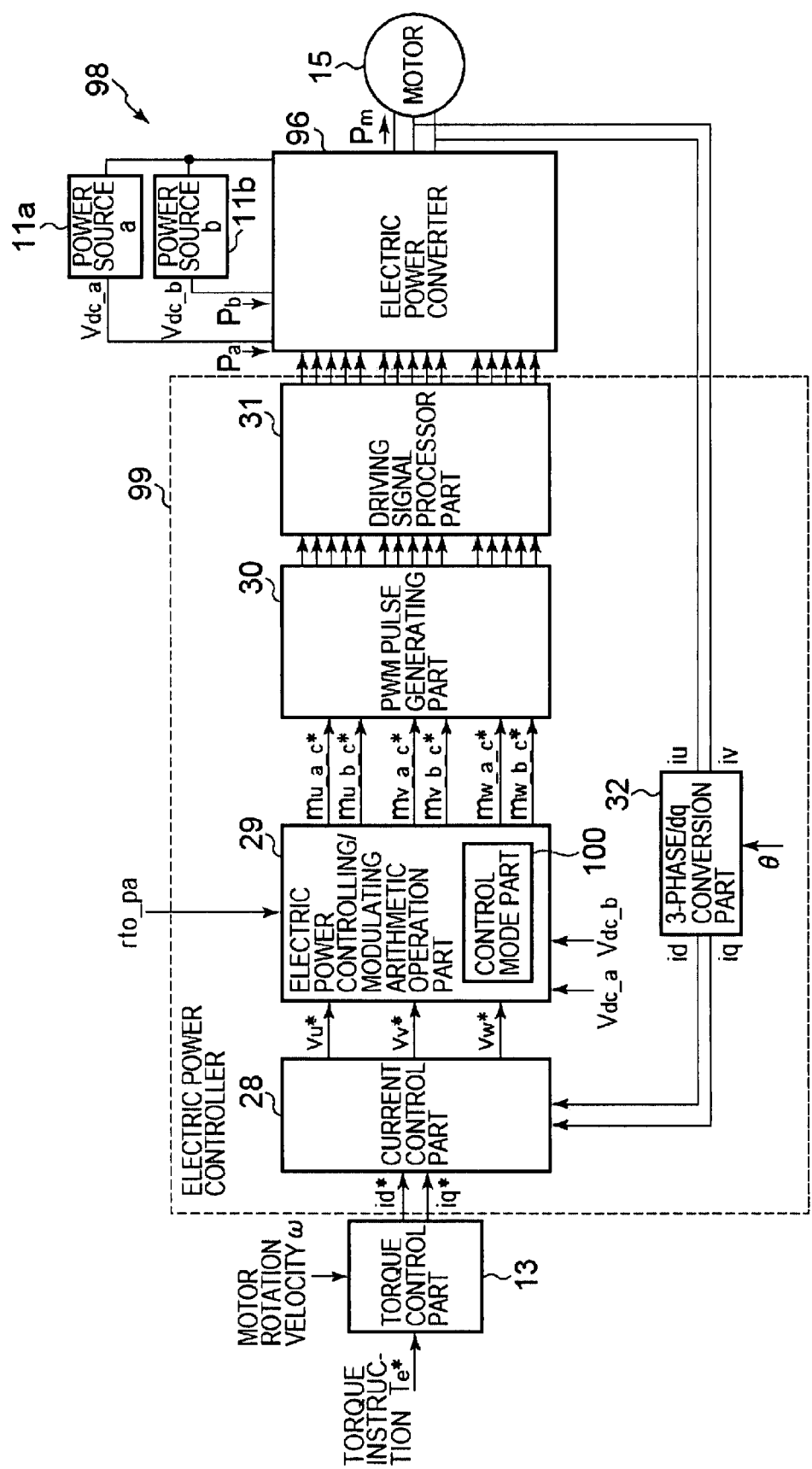
FIG. 37 is a block diagram illustrating the components of the electric power conversion control system in the tenth embodiment.

Although the arrangement of this circuitry is previously-known, as shown in FIG. 37, electric power controller 99 has electric power control/modulation rate arithmetic operation part 100, which results in a different control method. Electric power control/modulation rate arithmetic operation part 100 has the following modes. First, an A-mode wherein plural power sources work in the U-phase, V-phase and W-phase in a like manner to that previously-known, a B-mode wherein plural power sources work only in the U-phase just like the electric power control/modulation rate arithmetic operation part in the first embodiment, a C-mode wherein the U-phase in the first embodiment is changed to the V-phase, a D-mode where the U-phase of the first embodiment is changed to the W-phase, an E-mode wherein plural power sources work only in the U-phase and V-phase like the electric power control/modulation rate arithmetic operation part in the second embodiment, an F-mode wherein the U-phase and V-phase of the second embodiment are changed to the W-phase and V-phase and a G-mode wherein the U-phase and V-phase of the second embodiment are changed to the U-phase and W-phase. In B-mode through G-mode, there is a mode for the exchange of power source a and power source b.

Since the mode is switched by mode switching part 100, electric power control is possible without using a switch. That is, when a certain switch cannot be used due to a switch problem or the like, in the known art the corresponding power source cannot be used. However, in this tenth embodiment, it is possible to continue electric power control by switching the mode matched to the switch that is out of order.

In the tenth embodiment, even in the case of a defective switch or the like, it is possible to continue electric power control by means of a combination of the electric power controller in the first and second embodiments. For example, when a fuel cell is used in power source b, in the previously-known design, electric power control has to be continued with only the electric power left in power source a when a switch on the side of power source b is out of order. However, in the tenth embodiment, use of the residual phase to continue the electric power control with continued charging of power source a is preferable.

As explained above, according to the embodiments of the invention, the electric power converter that drives a multi-phase AC motor has a phase in which a driving voltage for driving the multi-phase AC motor connected to plural power sources is generated by generating and synthesizing output voltages of the plural power sources. Also, a phase in which the driving voltage of the multi-phase AC motor connected to one DC power source is generated by generating pulses from the output voltage of the DC power source. As a result, use and allotment of the power of plural power sources with fewer semiconductor elements are possible.

In the above, an explanation is given for the invention with reference to figures and application examples. However, those skilled in the art can make various modifications and amendments based on the present disclosure. Consequently, one should understand that those modifications and amendments are also included in the range of the invention. For example, the power sources that can be used in embodiments of the invention are not restricted to DC power sources. At least of one of the power sources may be any DC battery and capacitor that allows charge/discharge. Other power sources include fuel cells, uni-phase alternators, multi-phase alternators rectified by an inverter or the like, uni-phase AC commercial power sources, etc.

Figure 38:
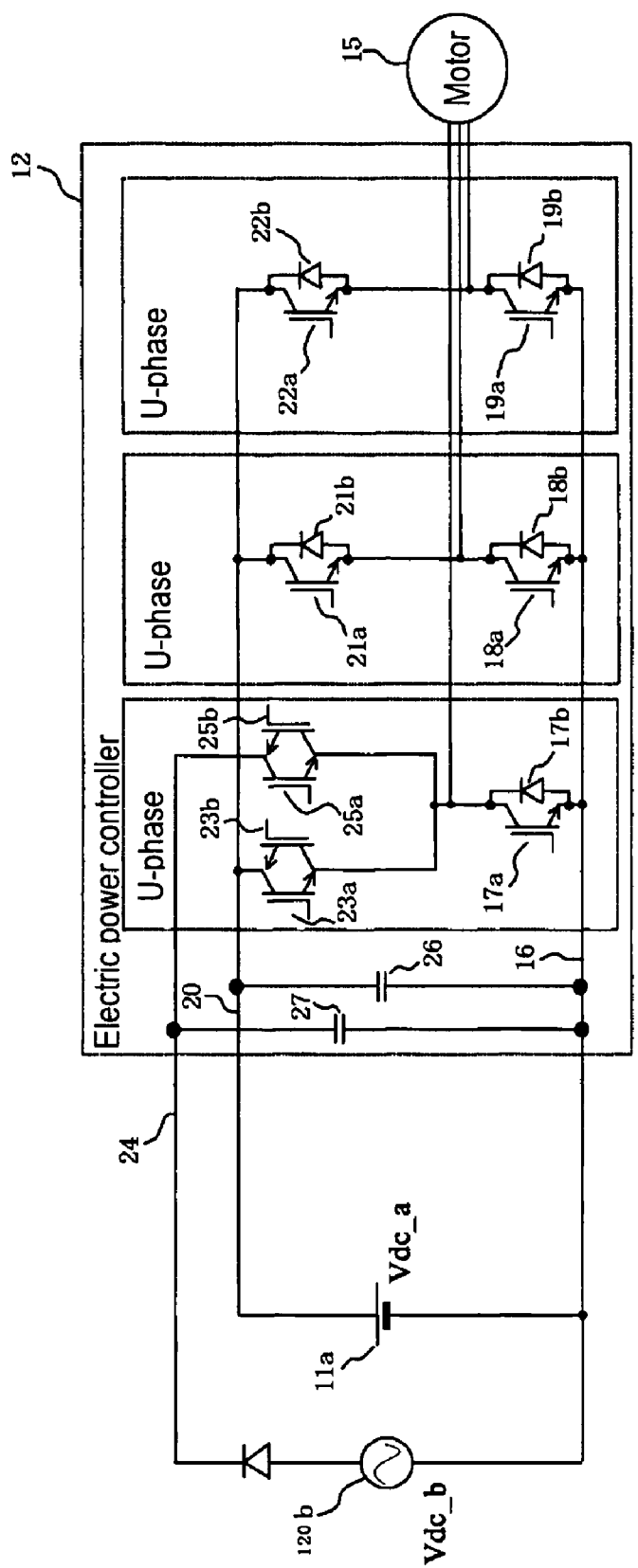
FIG. 38 is a circuit diagram illustrating an example of the power source in according to the first through tenth embodiments.

For example, as shown in FIG. 38, that connection can be made via a rectifier to avoid inversion of the voltage when using a uni-phase AC power source. Especially when a uni-phase AC power source 120b is used to control charging as described in the sixth through ninth embodiments, the scheme shown in FIG. 38 is useful. It is possible to adopt a simple construction for the charger in the equipment used by charging, such as electric automobiles that can be charged to run using a commercial power source.

Also, the above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An electric power converter for controlling feed voltages from plural power sources and driving a multi phase AC motor, the converter comprising:
an electric power conversion circuit; and
an electric power controller operable to control switching devices of the electric power conversion circuit to generate a driving voltage for driving at least a first phase of the motor by generating pulses from output voltages of the plural power sources; to generate a driving voltage for driving a different phase of the motor by generating pulses from an output voltage of only one of the plural power sources; and to generate pulses of a first ON time average value for each period of an electrical angle for switching devices of the first phase, the pulses corresponding to an allotment instruction of electric power of the plural power sources; and wherein the first ON time average value is different from a second ON time average value for each period of the electrical angle of the different phase.

2. The electric power converter according to claim 1 wherein the plural power sources include at least a first power source and a second power source; and wherein the electric power conversion circuit further comprises:
a first switching device between a high potential side of the first power source and the first phase of the motor;
a second switching device between a high potential side of the second power source and the first phase of the motor;
a third switching device between a common low potential side of the first power source and the second power source and the first phase of the motor;
a fourth switching device between the high potential side of the first power source and the different phase of the motor; and
a fifth switching device between the common low potential side of the first power source and the second power source and the different phase of the motor.

3. The electric power converter according to claim 2 wherein
the third switching device includes a diode and an active element without a reverse blocking function;
the first switching device includes an element having a reverse blocking function;
the second switching element includes an element having a reverse blocking function;
the fourth switching device includes a diode and an active element without a reverse blocking function; and
the fifth switching device includes a diode and an active element without a reverse blocking function.

4. The electric power converter according to claim 1 wherein the electric power controller further comprises:
a voltage offset compensation part operable to compensate for a difference between a phase voltage of the first phase and a phase voltage of the different phase.

5. The electric power converter according to claim 4 wherein the voltage offset compensation part is further operable to:
impart an offset value related to a voltage instruction value of the different phase to a voltage instruction value of the first phase.

6. The electric power converter according to claim 5 wherein the voltage offset compensation part is further operable to:
subtract the offset value from the voltage instruction value of the first phase before allotment of the first voltage instruction value to each of the plural power sources.

7. The electric power converter according to claim 5 wherein the voltage offset compensation part is further operable to:
subtract the offset value from allotted voltage instruction values associated with respective ones of the plural power sources after allotment of the voltage instruction value of the first phase to each of the plural power sources.

8. The electric power converter according to claim 7 wherein the voltage offset compensation part is further operable to:
add the offset value to or subtract the offset value from a first allotted voltage instruction value generated from one of the plural power sources with a highest power source voltage among the plural power sources.

9. The electric power converter according to claim 5 wherein the voltage offset compensation part is further operable to:
compute the offset value from voltage values of the plural power sources and an allotment proportion of the phase instruction value of the first phase.

10. The electric power converter according to claim 4 wherein the voltage offset compensation part is further operable to:
compute a feedforward offset value from voltage values of the plural power sources and an allotment proportion of the phase instruction value of the first phase;
detect a phase current of the first phase;
compute a feedback offset value from a difference between a phase current instruction value and the phase current of the first phase; and
compute the offset value from sum of the feedforward offset value and the feedback offset value.

11. The electric power converter according to claim 4 wherein the voltage offset compensation part is further operable to:
compute a feedforward offset value from voltage values of the plural power sources and an allotment proportion of the phase instruction value of the first phase;
detect a DC current component of the phase current;
compute a feedback offset value from a difference between a DC current instruction value of the first phase and the DC current component of the phase current; and
compute the offset value from sum of the feedforward offset value and the feedback offset value.

12. The electric power converter according to claim 1 wherein the electric power controller further comprises:
a motor torque controller operable to generate a first set of current instruction values for the motor from a torque instruction value and a rotation velocity of the motor; and
a charge power controller operable to generate a second set of current instruction values for the motor from electric power instruction values of each of the plural power sources.

13. The electric power converter according to claim 12 wherein the charge power controller is further operable to:
generate a d-axis current instruction value from an electrical angle and the electric power instruction values; and
set a sign of the d-axis current of the first phase based on the electric power instruction values.

14. The electric power converter according to claim 13 wherein the multi phase AC motor is a 3 phase AC motor and the first phase is a U phase; and wherein the charge power controller is further operable to, when a power source connected only to the U phase is charged:
set a sign of the d-axis current instruction value as negative in an electrical angle range where a cosine determined using the electrical angle is positive; and
set the sign of the d-axis current instruction value as positive in an electrical angle range where the cosine determined using the electrical angle is negative.

15. The electric power converter according to claim 13 wherein the multi phase AC motor is a 3 phase AC motor and the first phase is a U phase; and wherein the charge power controller is further operable to, when a power source connected to plural phases is charged:
set a sign of the d-axis current instruction value as positive in an electrical angle range where a cosine determined using the electrical angle is positive; and
set the sign of the d-axis current instruction value as negative in an electrical angle range where the cosine determined using the electrical angle is negative.

16. The electric power converter according to claim 13 wherein the multi phase AC motor is a 3 phase AC motor and the at least a first phase is a U phase and a V phase; and wherein the charge power controller is further operable to, when a power source connected only to the U phase and the V phase is charged:
set a sign of the d-axis current instruction value of a current of at least one of the U phase and V phase as negative in an electrical angle range where a cosine determined using the electrical angle is positive; and
set a sign of the d-axis current instruction value of the current of at least one of the U phase and V phase as positive in an electrical angle range where the cosine determined using the electrical angle is negative.

17. The electric power converter according to claim 13 wherein the multi phase AC motor is a 3 phase AC motor and the at least a first phase is a U phase and a V phase; and wherein the charge power controller is further operable to, when the only one of the plural power sources is charged:
set a sign of a d-axis current instruction value of a current of at least one of the U phase and V phase as positive in an electrical angle range where a cosine determined using the electrical angle is positive; and
set the sign of the d-axis current instruction value of the current of at least one of the U phase and V phase as negative in an electrical angle range where the cosine determined using the electrical angle is negative.

18. The electric power converter according to claim 12 wherein the charge power controller is further operable to:
generate a d-axis current instruction value of the motor from an electrical angle and the electric power instruction values;
generate a virtual electrical angle of the motor;
selectively input the virtual electrical angle to a dq/3 phase conversion part of the electric power controller; and
prohibit input of the virtual electrical angle to the dq/3 phase conversion part based on a value of the electrical angle of the motor.

19. The electric power converter according to claim 12, further comprising:
mechanical braking of the motor; and wherein the charge power controller is further operable to engage the mechanical braking while the first set of current instruction values is generated.

20. The electric power converter according to claim 12, further comprising:
a device for mechanically releasing the motor and a load shaft; and wherein the charge power controller is further operable to initiate a release while the first set of current instruction values is generated.

21. An electric power conversion system for driving a multi phase AC motor including plural power sources, the plural power sources including at least a first power source and a second power source, the system comprising:
an electric power converter configured to connect the first power source, the second power source and the motor, the electric power converter including:
switches connected the plural power sources and operable to produce a first driving voltage for driving the motor by generating pulses from output voltages of the plural power sources; and
a switch connected to only one of the plural power sources and operable to produce a second driving voltage for driving the motor by generating pulses from an output voltage of the only one of the plural power sources; and
an electric power controller configured to generate pulses of a first ON time average value for each period of an electrical angle for switches of a first phase of the motor, the pulses corresponding to an allotment instruction of electric power of the plural power sources; and wherein the first ON time average value is different from a second ON time average value for each period of the electrical angle of a different phase of the motor.

22. A control method for an electric power converter for driving a multi phase AC motor using plural power sources, the method comprising:
generating voltage instruction values of each phase of the motor including a first voltage instruction value of a phase generating pulses from output voltages of the plural power sources;
allotting the first voltage instruction value to respective voltage instruction values of each power source corresponding to an electric power allotment target;
computing a modulation rate of an operation of a switch corresponding to each power source in the allotting step;
correcting the modulation rate of the operation corresponding to each power source in the allotting step using a respective voltage of each power source;
computing a modulation rate of an operation of a switch corresponding to a phase generating pulses from only one power source based on a voltage instruction value of the phase generating pulses from the only one power source;
computing an offset voltage composed of a phase voltage of the phase generating pulses from only one power source and a phase voltage of the phase generating pulses from the output voltages of each of the plural power sources;
amending a voltage instruction value of the phase generating pulses from the output voltages of the plural power sources;
actuating a switch of the phase generating pulses from the output voltages of the plural power sources based on the modulation rate amended by the switch operation corresponding to the power sources; and
actuating a switch of the phase generating pulses from the only one power source based on the modulation rate of the phase generating pulses from the only one power source.

* * * * *